US012574441B1

(12) United States Patent
Thomas, Jr. et al.

(10) Patent No.: US 12,574,441 B1
(45) Date of Patent: Mar. 10, 2026

(54) MOVABLE BARRIER ANOMALY DETECTION AND DATA BACKFILLING

(71) Applicant: GMI HOLDINGS, INC., Mt. Hope, OH (US)

(72) Inventors: Robert Eugene Thomas, Jr., Flower Mound, TX (US); Thomas Kerber, Dallas, TX (US); Mahidhar Nandigam, Haslet, TX (US); Prudhvi Reddy Vemireddy, Irving, TX (US); Timothy Vriend, Lewisville, TX (US)

(73) Assignee: GMI Holdings, Inc., Mt. Hope, OH (US)

( * ) Notice: Subject to any disclaimer, the term of this patent is extended or adjusted under 35 U.S.C. 154(b) by 0 days.

(21) Appl. No.: 19/050,769

(22) Filed: Feb. 11, 2025

(51) Int. Cl.
| | |
|---|---|
| *H04L 67/12* | (2022.01) |
| *G07C 9/10* | (2020.01) |
| *E05F 15/70* | (2015.01) |

(52) U.S. Cl.
CPC ............... *H04L 67/12* (2013.01); *G07C 9/10* (2020.01); *E05F 15/70* (2015.01); *E05Y 2900/106* (2013.01)

(58) Field of Classification Search
CPC . H04L 67/12; G07C 9/10; E05F 15/70; E05Y 2900/106
See application file for complete search history.

(56) References Cited

U.S. PATENT DOCUMENTS

| | | | |
|---|---|---|---|
| 6,118,243 | A | 9/2000 | Reed |
| 6,184,641 | B1 | 2/2001 | Crimmins |

| | | | |
|---|---|---|---|
| 6,542,076 | B1 | 4/2003 | Joao |
| 6,542,077 | B2 | 4/2003 | Joao |
| 6,553,238 | B1 | 4/2003 | Ginzel |
| 6,792,321 | B2 | 9/2004 | Sepe, Jr. |
| 7,146,345 | B2 | 12/2006 | Weik, III |
| 7,196,611 | B2 | 3/2007 | Robb |
| 7,263,802 | B2 | 9/2007 | Fitzgibbon |
| 7,397,363 | B2 | 7/2008 | Joao |
| 7,468,676 | B2 | 12/2008 | Styers |
| 7,493,726 | B2 | 2/2009 | Fitzgibbon |
| 7,509,991 | B2 | 3/2009 | Weik, III |
| 7,532,709 | B2 | 5/2009 | Styers |
| 7,592,767 | B2 | 9/2009 | Rodriguez |
| 7,783,369 | B2 | 8/2010 | Shoda |

(Continued)

*Primary Examiner* — Amine Benlagsir

(74) *Attorney, Agent, or Firm* — Haynes and Boone, LLP

(57) ABSTRACT

A barrier operator monitoring system includes a barrier operator system and a cloud processing platform. The barrier operator system includes a movable barrier, sensors configured to measure data regarding the barrier operator system, and a barrier operator. The barrier operator is configured to move the movable barrier, detect a loss of a data connection between the barrier operator and the cloud processing platform, collect measured data from the sensors, perform wavelet transformation on the measured data, store coefficients of the wavelet transformation, and transmit, upon restoration of the data connection, the coefficients. The cloud processing platform is configured to receive the coefficients, reconstruct a representation of the measured data, compare the representation of the measured data to model data, detect an anomaly in the barrier operator system based on the comparison, and transmit a notification from the cloud processing platform to a user device.

20 Claims, 13 Drawing Sheets

(56) References Cited

U.S. PATENT DOCUMENTS

| | | | |
|---|---|---|---|
| 7,956,718 B2 | 6/2011 | Murphy | |
| 8,040,217 B2 | 10/2011 | Fitzgibbon | |
| 8,410,895 B2 | 4/2013 | Murphy | |
| 8,866,583 B2 | 10/2014 | Ordaz | |
| 8,952,783 B2 | 2/2015 | Fitzgibbon | |
| 8,994,496 B2 | 3/2015 | Freese | |
| 9,122,254 B2 | 9/2015 | Cate | |
| 9,141,099 B2 | 9/2015 | Cate | |
| 9,143,009 B2 | 9/2015 | Fitzgibbon | |
| 9,169,684 B2 | 10/2015 | Fan | |
| 9,219,721 B2 | 12/2015 | Farber | |
| 9,243,448 B2 | 1/2016 | Cui | |
| 9,367,978 B2 | 6/2016 | Sullivan | |
| 9,371,678 B2 | 6/2016 | Keller, Jr. | |
| 9,376,851 B2 | 6/2016 | Cate | |
| 9,396,598 B2 | 7/2016 | Daniel-Wayman | |
| 9,449,449 B2 | 9/2016 | Evans | |
| 9,495,815 B2 | 11/2016 | Fitzgibbon | |
| 9,514,643 B2 | 12/2016 | Fitzgibbon | |
| 9,574,387 B2 | 2/2017 | Jankovsky | |
| 9,580,957 B2 | 2/2017 | Goodman | |
| 9,587,420 B2 | 3/2017 | Keller, Jr. | |
| 9,605,468 B2 | 3/2017 | Cui | |
| 9,608,996 B2 | 3/2017 | Farber | |
| 9,644,416 B2 | 5/2017 | Fitzgibbon | |
| 9,666,006 B2 | 5/2017 | Kramer | |
| 9,698,997 B2 | 7/2017 | Arteaga-King | |
| 9,728,020 B2 | 8/2017 | Freese | |
| 9,734,644 B2 | 8/2017 | Samad | |
| 9,818,243 B2 | 11/2017 | Fitzgibbon | |
| 9,842,278 B2 | 12/2017 | Cheng | |
| 9,896,877 B2 | 2/2018 | Fitzgibbon | |
| 9,970,228 B2 | 5/2018 | Fitzgibbon | |
| 10,032,366 B2 | 7/2018 | Bodurka | |
| 10,096,187 B2 | 10/2018 | Deneen | |
| 10,126,737 B2 * | 11/2018 | Fitzgibbon | G05B 19/41855 |
| 10,138,671 B2 | 11/2018 | Fitzgibbon | |
| 10,163,290 B1 | 12/2018 | Burroughs | |
| 10,204,310 B2 | 2/2019 | Pulliam | |
| 10,229,548 B2 | 3/2019 | Daniel-Wayman | |
| 10,270,493 B2 | 4/2019 | Fitzgibbon | |
| 10,289,152 B1 | 5/2019 | Cheng | |
| 10,290,204 B2 | 5/2019 | Quaiser | |
| 10,294,708 B2 | 5/2019 | Quaiser | |
| 10,319,202 B2 | 6/2019 | Yau | |
| 10,354,467 B2 | 7/2019 | Baker | |
| 10,358,858 B2 | 7/2019 | Lietz | |
| 10,382,608 B2 | 8/2019 | Gerhardt | |
| 10,435,936 B2 | 10/2019 | Lietz | |
| 10,461,459 B1 | 10/2019 | Carey | |
| 10,487,563 B2 | 11/2019 | Quaiser | |
| 10,533,360 B2 | 1/2020 | Goodman | |
| 10,540,889 B2 | 1/2020 | Ikeler | |
| 10,551,871 B2 | 2/2020 | Cheng | |
| 10,563,456 B2 | 2/2020 | Bodurka | |
| 10,597,928 B2 | 3/2020 | Cate | |
| 10,614,647 B2 | 4/2020 | Deneen | |
| 10,636,236 B2 | 4/2020 | Burroughs | |
| 10,652,743 B2 | 5/2020 | Fitzgibbon | |
| 10,689,898 B2 | 6/2020 | Eslami | |
| 10,692,021 B2 | 6/2020 | Pulliam | |
| 10,708,410 B2 | 7/2020 | Gerhardt | |
| 10,713,869 B2 | 7/2020 | Morris | |
| 10,739,762 B2 | 8/2020 | Fitzgibbon | |
| 10,801,247 B2 | 10/2020 | Fitzgibbon | |
| 10,810,817 B2 | 10/2020 | Daniel-Wayman | |
| 10,823,879 B2 | 11/2020 | Fitzgibbon | |
| 10,832,543 B2 | 11/2020 | Cheng | |
| 10,837,217 B2 | 11/2020 | Cate | |
| 10,846,956 B2 | 11/2020 | Cate | |
| 10,880,526 B2 | 12/2020 | Fitzgibbon | |
| 10,907,398 B2 * | 2/2021 | Cate | G07C 9/00896 |
| 10,911,265 B2 | 2/2021 | Baker | |
| 10,927,583 B2 | 2/2021 | Fitzgibbon | |
| 10,934,763 B2 | 3/2021 | Fitzgibbon | |
| 10,970,954 B2 | 4/2021 | Farber | |
| 10,997,810 B2 * | 5/2021 | Atwell | G07C 9/00857 |
| 11,010,999 B2 | 5/2021 | Cate | |
| 11,028,633 B2 | 6/2021 | Fitzgibbon | |
| 11,055,942 B2 | 7/2021 | Coates | |
| 11,111,714 B2 | 9/2021 | Baer | |
| 11,122,430 B2 | 9/2021 | Fitzgibbon | |
| 11,187,026 B2 | 11/2021 | Cate | |
| 11,210,875 B2 | 12/2021 | Cate | |
| 11,211,071 B2 | 12/2021 | Levy | |
| 11,220,856 B2 | 1/2022 | Axtolis | |
| 11,225,823 B2 | 1/2022 | Cate | |
| 11,230,872 B2 | 1/2022 | Paulsson | |
| 11,248,576 B2 | 2/2022 | Crawford | |
| 11,261,648 B2 | 3/2022 | Axtolis | |
| 11,275,196 B2 | 3/2022 | Bratton | |
| 11,308,019 B2 | 4/2022 | Maloney | |
| 11,328,424 B1 | 5/2022 | Fitzgibbon | |
| 11,339,605 B2 | 5/2022 | Dreyer | |
| 11,354,958 B2 | 6/2022 | Myers | |
| 11,361,604 B1 | 6/2022 | Ordaz | |
| 11,393,331 B2 | 7/2022 | Ikeler | |
| 11,402,812 B1 | 8/2022 | Fitzgibbon | |
| 11,423,717 B2 | 8/2022 | Cate | |
| 11,462,067 B2 | 10/2022 | Atwell | |
| 11,474,278 B2 | 10/2022 | Fitzgibbon | |
| 11,488,077 B1 | 11/2022 | Lyman | |
| 11,523,090 B2 | 12/2022 | Cheng | |
| 11,551,497 B2 | 1/2023 | Wu | |
| 11,562,610 B2 | 1/2023 | Alamin | |
| 11,574,512 B2 | 2/2023 | Morris | |
| 11,578,527 B2 | 2/2023 | Hopkins | |
| 11,600,124 B2 | 3/2023 | Cate | |
| 11,600,126 B2 | 3/2023 | Burroughs | |
| 11,603,699 B2 | 3/2023 | Fitzgibbon | |
| 11,610,444 B2 | 3/2023 | Schrems | |
| 11,615,664 B2 | 3/2023 | Farber | |
| 11,639,617 B1 | 5/2023 | Farber | |
| 11,682,119 B1 | 6/2023 | Fitzgibbon | |
| 11,687,847 B2 | 6/2023 | Pulliam | |
| 11,746,584 B2 | 9/2023 | Ikeler | |
| 11,773,638 B2 | 10/2023 | Mastros | |
| 11,773,815 B2 | 10/2023 | Crawford | |
| 11,778,464 B2 | 10/2023 | Fitzgibbon | |
| 11,795,753 B1 | 10/2023 | Ikeler | |
| 11,869,289 B2 | 1/2024 | Cate | |
| 11,928,953 B2 | 3/2024 | Lovejoy | |
| 12,000,736 B2 | 6/2024 | Leeser | |
| 2003/0063715 A1 | 4/2003 | Peplinski | |
| 2007/0000622 A1 | 1/2007 | Reed | |
| 2010/0017337 A1 | 1/2010 | Butler | |
| 2012/0297681 A1 | 11/2012 | Krupke | |
| 2013/0290057 A1 | 10/2013 | Piel | |
| 2015/0059989 A1 | 3/2015 | Gutierrez | |
| 2015/0227284 A1 * | 8/2015 | Tehranchi | G05B 23/0216 |
| | | | 715/835 |
| 2015/0228135 A1 * | 8/2015 | Tehranchi | G07C 9/28 |
| | | | 340/5.61 |
| 2016/0189264 A1 | 6/2016 | Mello, II | |
| 2016/0196706 A1 * | 7/2016 | Tehranchi | H04L 63/08 |
| | | | 340/5.61 |
| 2016/0300415 A1 | 10/2016 | Deneen | |
| 2018/0114427 A1 | 4/2018 | Preus | |
| 2019/0281120 A1 | 9/2019 | Weik, III | |
| 2020/0043270 A1 * | 2/2020 | Cate | G07C 9/00571 |
| 2020/0115948 A1 | 4/2020 | Lietz | |
| 2020/0242862 A1 * | 7/2020 | Cate | G07C 9/00896 |
| 2020/0333756 A1 | 10/2020 | Weik, III | |
| 2021/0047873 A1 | 2/2021 | Cate | |
| 2021/0065259 A1 | 3/2021 | Luong | |
| 2021/0102421 A1 | 4/2021 | Fitzgibbon | |
| 2021/0209924 A1 | 7/2021 | Brown | |
| 2021/0233385 A1 | 7/2021 | Lovejoy | |
| 2021/0324672 A1 | 10/2021 | Altiner | |
| 2021/0381299 A1 | 12/2021 | Baer | |
| 2022/0019810 A1 | 1/2022 | Farber | |
| 2022/0230132 A1 | 7/2022 | Morris | |
| 2022/0301373 A1 | 9/2022 | Ordaz | |
| 2022/0351611 A1 | 11/2022 | Ikeler | |

(56) References Cited

U.S. PATENT DOCUMENTS

| | | | | |
|---|---|---|---|---|
| 2022/0375287 | A1 | 11/2022 | Cate | |
| 2022/0403693 | A1 | 12/2022 | Fitzgibbon | |
| 2023/0014636 | A1* | 1/2023 | Giron | E05F 15/77 |
| 2023/0020944 | A1 | 1/2023 | Fitzgibbon | |
| 2023/0068611 | A1 | 3/2023 | William | |
| 2023/0075215 | A1 | 3/2023 | Wesley | |
| 2023/0077408 | A1 | 3/2023 | Ordaz | |
| 2023/0090303 | A1 | 3/2023 | Morris | |
| 2023/0151671 | A1 | 5/2023 | Durochik | |
| 2023/0160785 | A1 | 5/2023 | Wu | |
| 2023/0177899 | A1* | 6/2023 | Morris | E05F 15/77 |
| | | | | 340/539.25 |
| 2023/0206709 | A1 | 6/2023 | Aaron | |
| 2023/0279719 | A1 | 9/2023 | Ikeler | |
| 2023/0340831 | A1* | 10/2023 | Ikeler | G08C 17/00 |
| 2024/0141711 | A1* | 5/2024 | Cate | E05F 15/77 |
| 2025/0218243 | A1* | 7/2025 | Citta | G07C 9/28 |

* cited by examiner

MOVABLE BARRIER ANOMALY DETECTION AND DATA BACKFILLING

FIELD

The present disclosure is directed to remote monitoring of barrier operators, including systems and methods for predicting, detecting, and reporting anomalies.

BACKGROUND

Barrier operators, such as garage door operators and gate operators, include sensors that may be configured to detect properties for various purposes. For example, a motor current sensor may be used to ensure safe operation, reversing movement of the door if a spike in current is detected. As another example, an encoder or other position sensor may monitor rotation of a motor shaft for feedback to a processor in controlling movement speed and barrier position. Sensor data from these various sensors is typically obtained by a barrier operator for use in control operations.

Barrier operators may also store various data in memory for control operations and maintenance management. For example, a cycle count may be maintained that indicates historical usage of the barrier operator. As another example, force profiles may be stored in memory that indicate an average, maximum, and/or minimum amount of force needed to move the barrier along various portions of its travel path.

However, this data typically is stored locally at a barrier operator or may be used in real-time and discarded without storage. A need exists to leverage information obtained by and/or available from a single barrier operator and/or a fleet of barrier operators to extend operating life, establish maintenance protocols, or otherwise improve operation of barrier operators.

SUMMARY

The present disclosure is directed to a barrier operator monitoring system for predicting, detecting, and reporting anomalies.

In an aspect of the present disclosure, a barrier operator monitoring system may include a barrier operator system, a cloud processing platform, and a controller. The barrier operator system may include a movable barrier, a barrier operator configured to move the movable barrier and maintain operational data, and one or more sensors configured to measure data regarding the barrier operator system. The controller may be configured to receive the operational data and the measured data, compare at least a portion of the operational data and the measured data to model data, detect an anomaly in the barrier operator system based on the comparison, and transmit a notification to a user, the notification identifying the detected anomaly.

In some examples, the detected anomaly may be a predicted failure of a component.

In some examples, the model data may be generated by the controller based on historical measured data corresponding to the barrier operator system. In some examples, the model data may be based on historical measured data received from a plurality of other barrier operator systems. Each barrier operator system of the plurality of other barrier operator systems may include one or more attributes corresponding to the barrier operator system. The controller may be configured to select the model data from a collection of model data based on the one or more attributes. The one or more attributes may include at least one of a model number, a firmware version, a barrier mass, a barrier dimension, a track dimension, meteorologic information, or a total cycle count.

In some examples, the model data may include a dynamic model, and the controller may be configured to receive operational data and measured data from a plurality of other barrier operators and generate at least a portion of the model data based on the operational data and measured data from the plurality of other barrier operators using machine learning. The controller may be configured to receive application data from one or more users, the application data including historical operational data and anomaly classification data, and refine the model data based on the application data.

In some examples, the one or more sensors may include at least one of a motor current sensor, an incoming voltage sensor, a barrier position sensor, or a temperature sensor. In some examples, the measured data may include at least one of motor current, input voltage, or barrier position and the model data may include functions for estimating at least one attribute of the barrier operator system based on the measured data. The at least one attribute may include a mass of the barrier. The at least one attribute may include a spring constant of a spring of the barrier operator system. The at least one attribute may include a track radius or a number of panels of a barrier of the barrier operator system.

In some examples, the anomaly may include a malfunctioning safety beam. In some examples, the barrier operator may include the controller. In some examples, the cloud processing platform may include the controller. The measured data received at the controller may include differences in each field included in the measured data. The barrier operator may be configured to quantize the measured data before transmitting the quantized measured data to the controller.

In an aspect of the present disclosure, a method of detecting anomalies in a barrier operator system includes receiving operational data from a barrier operator configured to move a movable barrier, receiving measured data from one or more sensors of the barrier operator system, comparing at least a portion the operational data and the measured data to model data, detecting an anomaly in the barrier operator system based on the comparison, and transmitting a notification to a user, the notification identifying the detected anomaly.

In an aspect of the present disclosure, a barrier operator monitoring system may include a barrier operator system, a cloud processing platform, and a controller. The barrier operator system may include a movable barrier, a barrier operator configured to move the movable barrier and maintain operational data, and one or more sensors configured to measure data regarding the barrier operator system. The controller may be configured to receive the measured data and the operational data, detect an anomaly in the barrier operator system based at least in part on the measured data and the operational data, compare at least a portion of the measured data and the operational data to model data, classify the anomaly based on the comparison, and transmit a notification to a user, the notification identifying the classified anomaly.

In some examples, the controller may be further configured to generate a force profile based on the measured data indicating a force exerted by a motor of the barrier operator over the course of a barrier movement cycle and detect the anomaly in the barrier operator system based on the force profile.

In some examples, the barrier operator may include the controller. In some examples, the cloud processing platform may include the controller.

In some examples, the one or more sensors may include at least one of a motor current sensor, an incoming voltage sensor, a barrier position sensor, or a temperature sensor.

In some examples, the controller may be configured to classify the anomaly as a spring failure when the operational data indicates a cycle count above a threshold value and the measured data indicates a spike in force near a closed position of the movable barrier. In some examples, the controller may be configured to classify the anomaly as a predicted spring failure when the operational data indicates a total cycle count above a threshold cycle count value and the measured data indicates the movable barrier has been in an unbalanced configuration that exceeds a balance threshold. The balance threshold may include at least one of a duration of time, a magnitude of imbalance, an imbalanced cycle count, or a combination thereof. The duration of time may include at least one of a duration of time during which the movable barrier has been closed or a duration of time during which a spring has been unbalanced. The balance threshold may include a variation in a spring constant of a spring.

In some examples, the controller may be configured to classify the anomaly as an unbalanced barrier when the measured data indicates a drift in force required to open the moveable barrier or a drift in force required to close the movable barrier. In some examples, the controller may be configured to classify the anomaly as an unbalanced barrier when the measured data indicates a force required to open the movable barrier differs from a force required to close the movable barrier by a threshold amount. In some examples, the controller may be configured to classify the anomaly as an incorrect spring when the measured data indicates the movable barrier has a balanced condition when fully closed and an unbalanced condition when midway between fully open and fully closed. In some examples, the controller may be configured to classify the anomaly as a mechanical obstruction when the measured data indicates at least one of a significant increase in force exerted by a motor or significant decrease in barrier movement speed. In some examples, the controller may be configured to classify the mechanical obstruction based on at least one of a position of the movable barrier when the anomaly occurs or a direction of travel of the movable barrier. In some examples, the controller may be configured to classify the anomaly as a displaced cable when the measured data indicates a spike in motor current upon initiating an opening movement of the movable barrier subsequent to encountering a mechanical obstruction during a preceding closing movement. In some examples, the controller may be configured to classify the anomaly as a damaged barrier when the measured data indicates an increased magnitude of force required to close the movable barrier when the movable barrier is near an open limit. In some examples, the controller may be configured to classify the anomaly as a damaged track when the measured data indicates consistent periodic spikes during a movement cycle of the movable barrier. In some examples, the controller may be configured to classify the anomaly as an improper limit setting when the measured data indicates a spike in motor current or force is experienced each time the movable barrier reaches a closed limit.

In an aspect of the present disclosure, a method of detecting anomalies in a barrier operator system may include receiving measured data generated by one or more sensors of a barrier operator system and operational data generated by a barrier operator of the barrier operator system, detecting an anomaly in the barrier operator system based at least in part on the measured data and the operational data, comparing at least a portion of the measured data to model data, classifying the anomaly based on the comparison, and transmitting a notification to a user, the notification identifying the classified anomaly.

In an aspect of the present disclosure, a barrier operator monitoring system may include a barrier operator system and a cloud processing platform. The barrier operator system may include a movable barrier, one or more sensors configured to measure data regarding the barrier operator system, and a barrier operator. The barrier operator may be configured to move the movable barrier, detect a loss of a data connection between a barrier operator of a barrier operator system and a cloud processing platform, collect measured data from the one or more sensors during the loss of the data connection, perform wavelet transformation on the measured data, store one or more coefficients of the wavelet transformation, and transmit the one or more coefficients upon restoration of the data connection. The cloud processing platform may be configured to receive the one or more coefficients, reconstruct a representation of the measured data based on the one or more coefficients, compare the representation of the measured data to model data, detect an anomaly in the barrier operator system based on the comparison, and transmit a notification from the cloud processing platform to a user device, the notification identifying the detected anomaly.

In some examples, the barrier operator may be configured to store the one or more coefficients of the wavelet transformation only when the one or more coefficients are different than corresponding coefficients of a previous wavelet transformation performed on previously measured data. In some examples, the barrier operator may be further configured to transmit a total cycle count upon restoration of the data connection and the cloud processing platform may be further configured to estimate timing of barrier operations during a period of time corresponding to the loss of the data connection.

In some examples, the cloud processing platform may be further configured to estimate a number of barrier operations performed during a period of time corresponding to the loss of the data connection based on a change in cycle count over time occurring prior to the loss of the data connection. In some examples, the wavelet transformation may include convolution of a force profile with one or more wavelet functions. The force profile may correspond to force exerted over time and/or force exerted over barrier position.

In some examples, the one or more sensors may include a motor current sensor, an incoming voltage sensor, a barrier position sensor, and/or a temperature sensor.

In some examples, the cloud processing platform may be further configured to generate the model data. The model data may be based on historical measured data received from the barrier operator. The model data may be based on historical measured data received from a plurality of barrier operators.

In some examples, the cloud processing platform may be configured to send an instruction to the barrier operator to suspend operation based on the detected anomaly.

In an aspect of the present disclosure, a method for use in a barrier operator monitoring system to backfill missing data may include, at the barrier operator, detecting a loss of a data connection between a barrier operator of a barrier operator system and a cloud processing platform, collecting measured data from one or more sensors during the loss of the data connection, performing wavelet transformation on the measured data; storing one or more coefficients of the wavelet transformation, and transmitting, upon restoration of the data connection, the one or more coefficients to the cloud processing platform. The method may include, at the cloud processing platform, reconstructing a representation of the measured data based on the one or more coefficients, comparing the representation of the measured data to model data, detecting an anomaly in the barrier operator system based on the comparison, and transmitting a notification from the cloud processing platform to a user device, the notification identifying the detected anomaly.

In some examples, the barrier operator may be configured to store the one or more coefficients of the wavelet transformation only when the one or more coefficients are different than corresponding coefficients of a previous wavelet transformation performed on previously measured data.

In some examples, the wavelet transformation may include convolution of a force profile with one or more wavelet functions. In some examples, the wavelet transformation may include convolution of a motor current profile with one or more wavelet functions.

In some examples, the method may further include transmitting from the cloud processing platform to the barrier operator an instruction to suspend or alter operation based on the detected anomaly.

Other examples include corresponding methods, computer systems, apparatus, and computer programs recorded on one or more computer storage devices, each configured to perform the actions described herein.

It is to be understood that both the foregoing general description and the following detailed description are exemplary and explanatory in nature and are intended to provide an understanding of the present disclosure without limiting the scope of the present disclosure. In that regard, additional aspects, features, and advantages of the present disclosure will be apparent to one skilled in the art from the following detailed description.

BRIEF DESCRIPTION OF THE DRAWINGS

The accompanying drawings illustrate implementations of the systems, devices, and methods disclosed herein and together with the description serve to explain the principles of the present disclosure.

Figure 1:
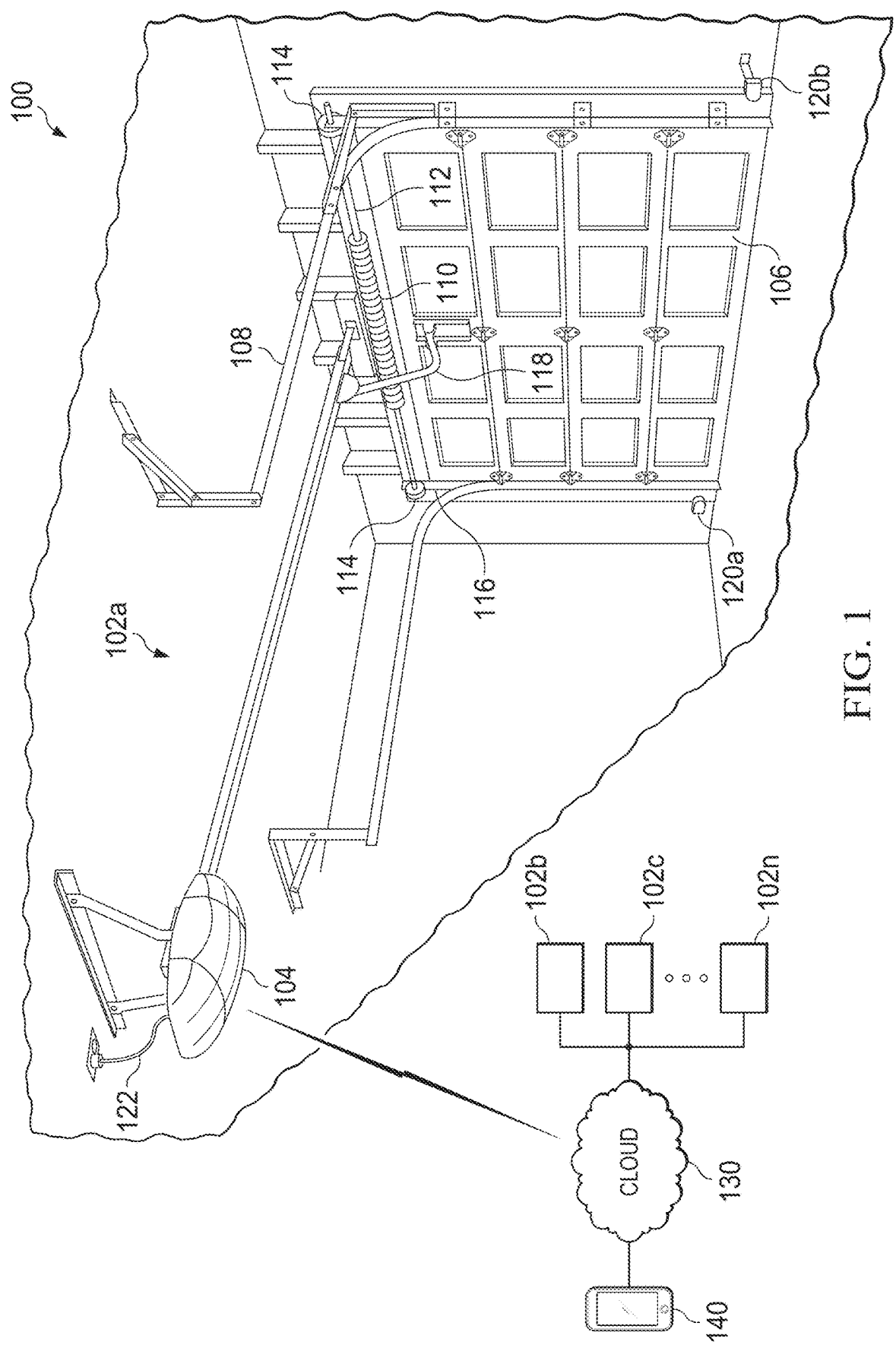
FIG. 1 shows a barrier operator monitoring system in accordance with an example of the present disclosure.

Examples of the present disclosure and their advantages are best understood by referring to the detailed description that follows. It should be appreciated that like reference numerals are used to identify like elements illustrated in one or more of the figures, wherein showings therein are for purposes of illustrating examples of the present disclosure and not for purposes of limiting the same.

DETAILED DESCRIPTION

For the purpose of promoting an understanding of the principles of the present disclosure, reference will now be made to the examples illustrated in the drawings and specific language will be used to describe them. It will nevertheless be understood that no limitation of the scope of the disclosure is intended. Any alterations and further modifications to the described systems, devices, methods, and any further application of the principles of the present disclosure are fully contemplated as would normally occur to one skilled in the art to which the disclosure relates. In addition, this disclosure describes some elements or features in detail with respect to one or more examples or Figures, when those same elements or features appear in subsequent Figures, without such a high level of detail. It is fully contemplated that the features, components, and/or steps described with respect to one or more examples or Figures may be combined with the features, components, and/or steps described with respect to other examples or Figures of the present disclosure. For simplicity, in some instances the same or similar reference numbers are used throughout the drawings to refer to the same or like parts. The drawing figures are not necessarily drawn to scale and certain elements are shown in generalized or schematic form in the interest of clarity and conciseness. It should be understood that the embodiments of the disclosure herein described are merely illustrative of the principles of the present disclosure.

The devices and techniques disclosed herein may be used to detect current anomalies or predict future anomalies in a barrier operator system. Such a barrier operator system may include, but is not limited to, a barrier operator, a barrier, a track along which the barrier moves, and other associated hardware (e.g., safety devices, chains or belts, springs, etc.). While examples herein refer to garage door operator systems, it should be appreciated that the disclosure herein is similarly applicable to gate operator systems and other movable barrier systems without departing from the scope of this disclosure.

FIG. 1 illustrates a barrier operator monitoring system 100. A barrier operator system 102a includes all components of the system local to a barrier installation. A barrier operator 104 is configured to move a movable barrier 106 along tracks 108. A spring 110 supported on a shaft 112 aids the barrier operator 104 in moving the movable barrier 106. Cables 116 attached at one end to the movable barrier 106 are wrapped around cable drums 114 at the other end, which are supported on the shaft 112. An arm 118 connects the movable barrier 106 to the drive system (e.g., chain, pulley, screw drive) of the barrier operator 104 and can be manually released therefrom for manual movement of the movable barrier 106. A safety beam 120 is positioned adjacent the bottom of the movable barrier 106 and consists of a transmitter 120a and receiver 120b pair of modules (also referred to as photoeyes). In some examples, one module of the safety beam 120 includes a transmitter and a receiver while the other module includes a reflector. An incoming power supply 122 connects the barrier operator 104 to a power source.

The barrier operator monitoring system 100 further includes a cloud processing platform 130. The barrier operator 104 is in operative communication with the cloud processing platform 130 through any suitable means including, but not limited to, a wired connection and/or a wireless connection (e.g., a Wi-Fi router). The cloud processing platform 130 is further in operative communication with a plurality of other barrier operator systems 102b-102n. One or more of the barrier operator systems 102b-102n may be disposed at the same premises as the barrier operator system 102a or at a different premises. Collectively, barrier operator systems 102a-102n may be referred to as a fleet of barrier operator systems. The barrier operator systems of the fleet may all have one or more common attributes (e.g., barrier operator model number, motor model, firmware version, barrier mass, barrier dimension, track dimension, meteorologic information, or total cycle count of barrier operator, etc.). Alternatively, the fleet may comprise barrier operators having distinct attributes or a combination of common and distinct attributes.

The barrier operator monitoring system 100 also includes a personal electronic device 140. The personal electronic device 140 may be a smartphone, tablet computer, laptop computer, desktop computer, smartwatch, or any other suitable user device to communicate with the cloud processing platform 130. The personal electronic device 140 may execute an application allowing a user to control (e.g., send open or close commands, activate a worklight, enable/disable a vacation mode or lock, etc.) one or more barrier operators 104 of one or more of the barrier operator systems 102a-102n. The personal electronic device 140 may also receive monitoring information from the cloud processing platform 130, which may be generated by the cloud processing platform 130 or relayed by the cloud processing platform 130 from one or more barrier operators 104. It should be appreciated that while only one personal electronic device 140 is shown, the barrier operator monitoring system 100 may include any number of personal electronic devices.

Typically, data transmission from the barrier operator 104 to the cloud processing platform 130 is anticipated to occur via an Internet router (e.g., Wi-Fi router) at the premises. However, in some instances, a router may be unavailable or offline or an internal issue in the barrier operator may cause a loss of connection with the router. In such instances, the personal electronic device 140 may be used as a bridge to establish a connection between the barrier operator 104 and the cloud processing platform 130. In some examples, the personal electronic device 140 may simply relay data to and from the cloud processing platform 130. In some examples, the personal electronic device 140 may perform data analysis and transmit results to the barrier operator 104 and/or the cloud processing platform 130.

Figure 2:
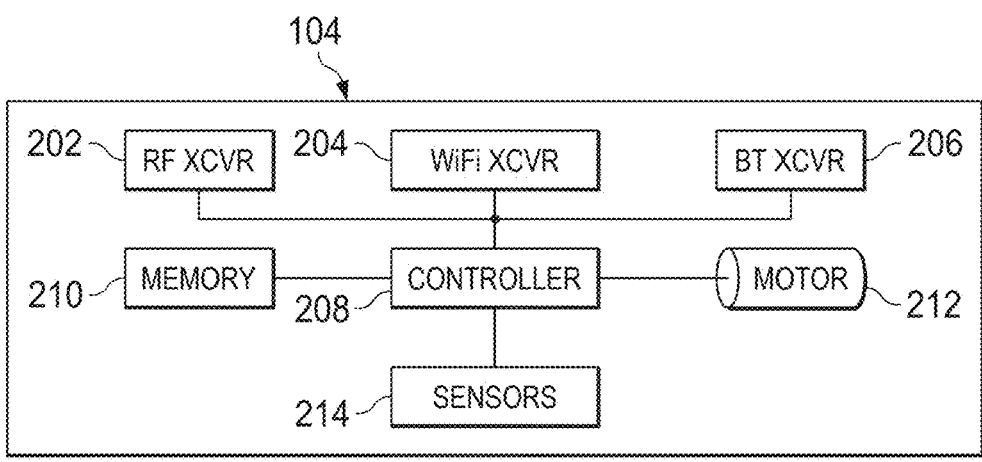
FIG. 2 shows a box diagram of a barrier operator in accordance with an example of the present disclosure.

FIG. 2 illustrates an example of a barrier operator 104. The barrier operator 104 includes transceivers 202-206. A radio frequency ("RF") transceiver 202 may communicate with one or more transmitters used to instruct operation of the barrier operator 104 (e.g., a portable hand-held transmitter, a wall mounted control console, a vehicle mounted transmitter such as HomeLink™, etc.). In some examples, the RF transceiver 202 may be configured for two-way communication with such remote control devices and in some examples the RF transceiver may be a receiver configured for one-way communication with such remote control devices. A Wi-Fi transceiver 204 may be configured for wireless communication with a Wi-Fi router at the premises of the barrier operator system 102a. A Bluetooth™ transceiver 206 may be configured for wireless communication with the personal electronic device 140 and/or accessory devices in the barrier operator system (e.g., door position sensor, safety beam, etc.). Additionally or alternatively, the barrier operator 104 may utilize wired communication with one or more devices such as a wired wall console, an Internet router, safety beam, etc. The barrier operator 104 further includes a controller 208 which includes one or more processors in communication with memory 210. The memory 210 may store firmware or software executable by the controller 208 to perform typical functions of the barrier operator 104. The memory 210 may store instructions executable by the controller 208 to perform one or more of the methods disclosed herein. The memory 210 may also store operational data generated and/or maintained by the controller 208 such as, but not limited to, force limit profiles, control threshold values, a total cycle count of the barrier operator 104, error codes, status information, etc. An example of use of force limit profiles is provided in U.S. Pat. App. Pub. No. 2012/0297681 entitled "Multiple Speed Profiles in Barrier Operator Systems," which is hereby incorporated by reference herein in its entirety. The memory may store one or more diagnostic models or algorithms as discussed herein. The memory 210 may further store measured data generated by sensors 214 in relation to operation of the motor 212. The sensors 214 may include one or more of a motor current sensor, an incoming voltage sensor, a barrier position sensor, or a temperature sensor. A motor current sensor may be configured to measure the current required to operate the motor 212. As the controller 208 may control the motor 212 to operate at a generally constant speed, motor current tends to directly correspond to an amount of force or torque exerted by the motor 212 to overcome any resistance (such as a mass of the barrier 106 not accommodated by the spring 110, friction in roller bearings, friction from the tracks 108, obstructions, etc.), particularly during constant flux after the inrush current creates the magnetic field. In this regard, a motor current sensor or a motor torque sensor may be referred to as a force sensor based on the correspondence between motor current, torque, and force. An example of a motor current sensor is discussed in U.S. Pat. No. 6,118,243 entitled "Door Operator System," which is hereby incorporated by reference herein in its entirety. An incoming voltage sensor may be configured to monitor the voltage of the power supply 122 which ideally would be constant but which can fluctuate with noise, surges, or lags. A barrier position sensor may include a motor shaft encoder which monitors rotation of the motor 212 and monitors speed as well as a position of the barrier based on revolutions, speed, and/or direction of movement of the motor shaft. Examples of optical and magnetic encoders are discussed in U.S. Pat. App. Pub. No. 2022/0351611 entitled "Remote Monitoring and Control of Movable Barrier Status" and U.S. Pat. App. Pub. No. 2007/0000622 entitled "Barrier Operator with Magnetic Position Sensor," which are hereby incorporated by reference herein in their entirety. Additionally or alternatively, a barrier position sensor may be secured to movable barrier 106 to directly monitor position. An example of such a sensor is discussed in U.S. Pat. App. Pub. No. 2016/0300415 entitled "Automatic Transmission of a Barrier Status and Change of Status Over a Network," which is hereby incorporated by reference herein in its entirety. Sensors 214 may include a clock used at least in part in combination with a barrier position sensor to derive barrier speed and/or acceleration. A temperature sensor in the barrier operator 104 may be configured to measure one or more of an ambient temperature in the environment of the barrier operator 104, a temperature of the motor 212, an air temperature inside a housing of the barrier operator 104, or a temperature of any other component of the barrier operator 104. The above-described measured data may not always be accurate as it may be affected by external considerations. For example, current measurements may be influenced by ambient temperature or by incoming voltage from a power supply. As another example, noise in the circuitry of a barrier operator may interfere with accurate voltage measurements. Accordingly, some methods disclosed herein may utilize techniques to account for noise in measured data, as discussed further below.

Figure 3:
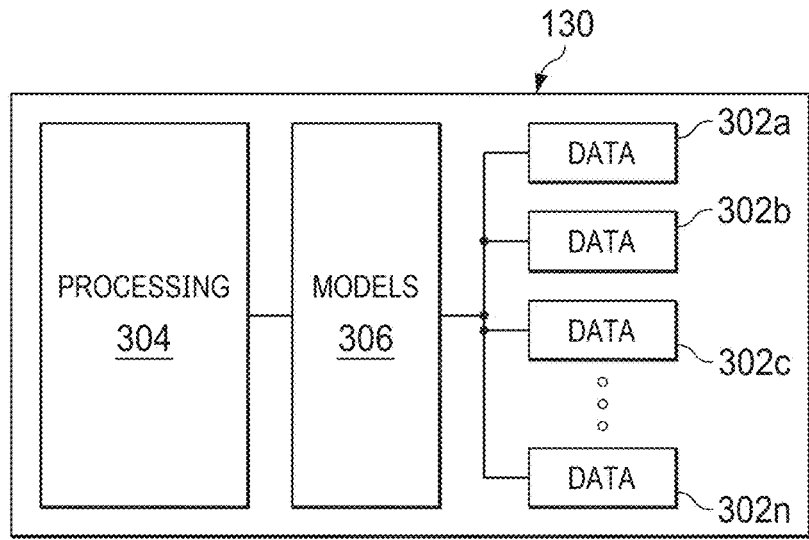
FIG. 3 shows a box diagram of a cloud processing platform in accordance with an example of the present disclosure.

FIG. 3 illustrates an example of a cloud processing platform 130. Cloud processing platform 130 may include one or more Internet-accessible servers configured to operate in the barrier operator monitoring system 100. The cloud processing platform 130 includes a processing module 304. In the context of the present disclosure, the processing module 304 may be referred to as a controller and may include one or more processors. The cloud processing platform 130 may include memory that stores one or more diagnostic models or algorithms 306 as discussed herein. The models 306 may be used by processing module 304 in analyzing data 302 from one or more barrier operator systems 102. For example, data 302a may be received at the cloud processing platform 130 from barrier operator system 102a, data 302b may be received from barrier operator system 102b, etc. Data 302a may include some or all of product information (e.g., operator model, motor horsepower rating, date of manufacture, bill of materials, firmware version, etc.), installation information (e.g., barrier type, barrier mass, barrier dimensions, spring parameters, track dimensions, meteorologic data at the location of the premises), measured data (e.g., sensor data), historical data (e.g., measured data from previous barrier movement cycles), or operational data (e.g., cycle count). In some examples, cloud processing platform 130 is configured to execute machine learning to develop one or more of the models 306. An example of a cloud processing platform is provided in U.S. Pat. App. Pub. No. 2023/0279719 entitled "Remote Monitoring and Control of Moveable Barrier in Jackshaft Door Operator System," which is hereby incorporated by reference herein in its entirety.

Figure 4:
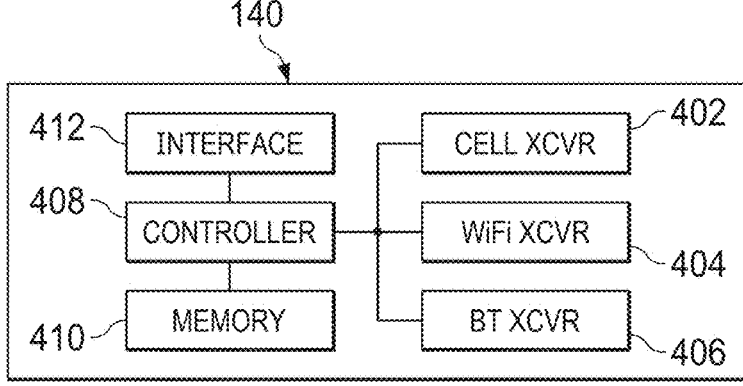
FIG. 4 shows a box diagram of a personal electronic device in accordance with an example of the present disclosure.

FIG. 4 illustrates an example of a personal electronic device 140. A cellular transceiver 402 is configured to communicate with a mobile data network (e.g. 4G LTE, 5G, etc.). A Wi-Fi transceiver 404 is configured to communicate with a Wi-Fi router. A Bluetooth™ transceiver 406 is configured to communicate with the barrier operator 104 via Bluetooth™ transceiver 206. Each of these transceivers is in operative communication with a controller 408 which includes one or more processors. The controller 408 is in communication with memory 410 and user interface 412. As an example, when personal electronic device 140 is in the form of a smartphone, user interface 412 may be a touchscreen.

Anomalies

If a barrier operator system, such as barrier operator system 102a is not properly maintained or becomes damaged, reliability may be negatively impacted. Some barrier operator system owners neglect recommended maintenance procedures and may attempt to operate a barrier operator 104 when components of the barrier operator system are damaged or worn. Operating a barrier operator system that has not been maintained properly, for example, when hardware is damaged, after a spring 110 has failed, or when a spring is out of balance, may cause further damage to the barrier operator system 102a and/or reduce the service life.

Components of barrier operator systems have various conditions or failures considered to be anomalies that need to be promptly addressed to ensure safe operation and acceptable service life of the system. For example, a spring 110 may be excessively stressed when a barrier 106 is unbalanced or an improper spring is installed. Springs may also stretch over time requiring rebalancing of the barrier or may become dirty or rusty which can influence rotational movement between adjacent coils of the spring. If these conditions are not addressed, a spring may eventually fail prematurely. Rails or tracks 108 may be misaligned, bent, or joined segments may become loosened. These conditions may cause rubbing, friction, and binding between rollers on the barrier 106 and the track 108 or may create gaps between the barrier and surrounding enclosure. Barriers may be bent or otherwise damaged, for example due to excessive wind or a collision from a vehicle. Additionally, owners may modify a barrier with seasonal decoration, a façade, insulation, or other modifications that alter the weight of the barrier. Cables 116 between the barrier and spring shaft 112 may slip off or otherwise become dislocated from the cable drum 114 or an improper drum size may be installed. In some instances, the effective lengths of the cables on opposing ends of the barrier may be different, causing misalignment between the barrier and tracks. Rollers may become bent or broken, a bearing may fail, or in some instances a roller may even become disconnected from the barrier. Hinges between adjacent barrier panels of a multi-panel barrier may become loose or corroded, influencing alignment and movement of the barrier. Weather strips may become loose from the barrier or may deteriorate, thereby failing to seal the bottom of the barrier allowing precipitation, debris, and pests to enter the interior of surrounding enclosure. Barrier operator settings may be configured improperly, for example, with up and/or down limits or maximum force set incorrectly. Hardware in the barrier operator may wear, including for example motor bearing failure, motor insulation deterioration, power train damage, or gearbox wear. Accessory devices such as safety beams 120a, 120b may be improperly selected or may be configured such that transmitter and receiver modules are misaligned or receive interference from an external source such as another safety beam or sunlight. Mechanical features of the environment around a barrier operator system may influence operation such as an obstacle blocking travel of the barrier. Shovels or rakes leaning against a track or laying on the ground may interfere with barrier movement. A vehicle may be parked too closely and obstruct the travel path of the barrier. Snow or ice may accumulate on or around the barrier operator system and interfere with barrier movement. In some instances, a barrier lock or latch may be engaged when the owner attempts to move the barrier. Electrical conditions of the environment around the barrier operator may also negatively influence operation. For example, a power supply 122 may experience voltage variation such as a power surge or sag.

While numerous anomalies, such as those mentioned above, may negatively influence operation and/or service life of a barrier operator system, some of the most common reasons for technician service calls include spring failure, barrier wear (including rollers and hinges), barrier damage due to impact (including bent barrier sections and bent track), mechanical obstructions (including those causing cable dislocation from a drum and/or motor overload), safety beam conditions (including misalignment and interference), and electrical conditions.

Some anomalies which are critical to ensuring proper operation and service life of a barrier operator system but which are commonly unaddressed by owners include an unbalanced barrier and improper down limit settings. When a barrier is imbalanced, the spring does not properly offset the mass of the barrier and the motor of the barrier operator may overloaded. When a down limit is set too low, excessive force is applied to the barrier by the barrier operator driving the barrier into the ground (e.g., pavement or other abutment surface beneath the barrier). When a down limit is set too high, a gap is permitted between the bottom of the barrier and the ground allowing precipitation, debris, and pests to enter the garage or other enclosure around the barrier.

In order to address the above-mentioned anomalies, among others, the present disclosure contemplates utilizing data collected and/or maintained by a barrier operator to monitor operating conditions, diagnose current anomalies, predict future anomalies, recommend maintenance, and/or report conditions to users.

Data Collection & Modeling

Figure 5:
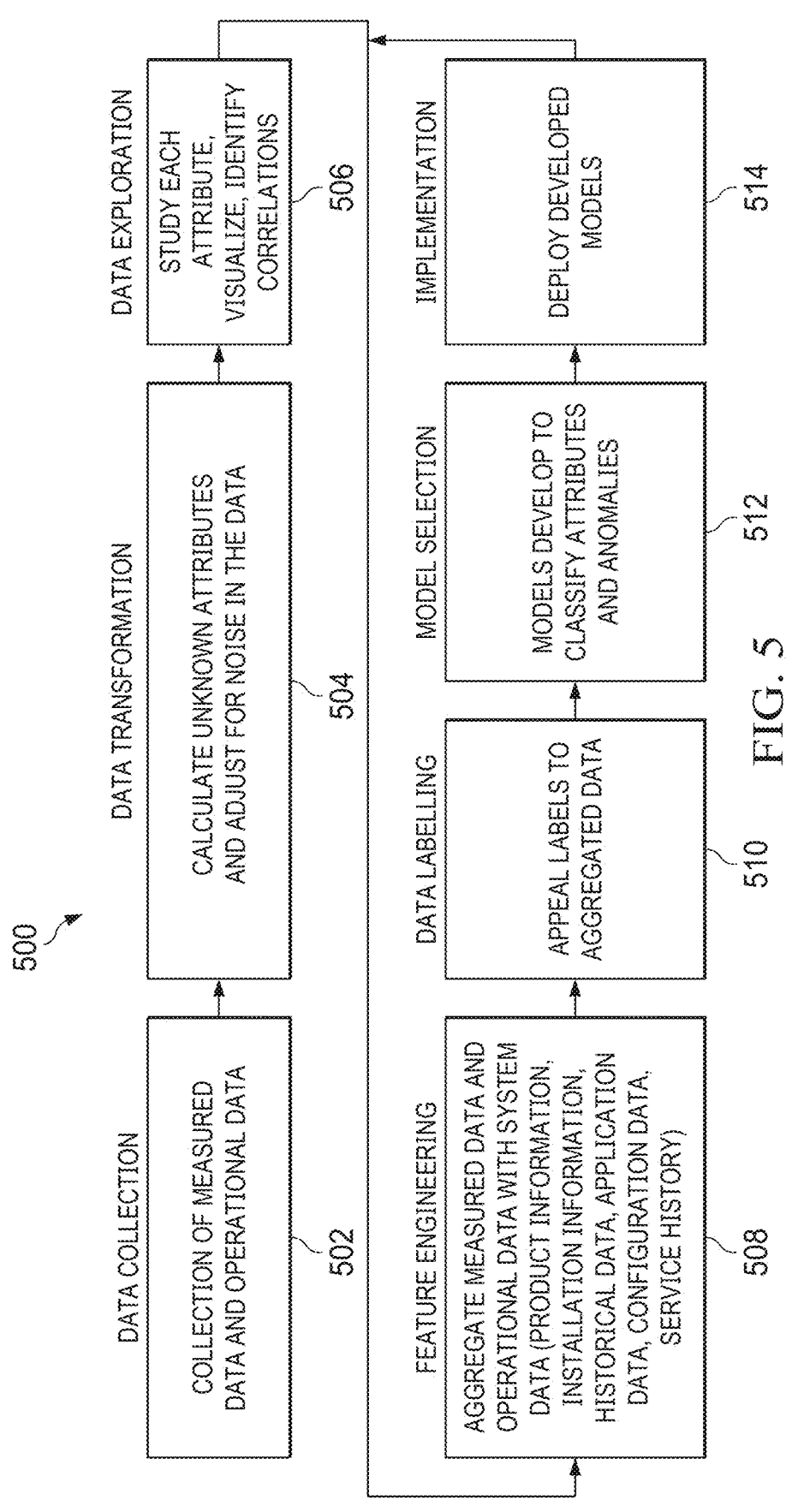
FIG. 5 shows a flowchart of a method of generating a diagnostic model in accordance with an example of the present disclosure.

FIG. 5 illustrates a method 500 of generating a diagnostic model in a barrier operator monitoring system 100. It should be appreciated that the processes 502-514 of method 500 are illustrated in an order that is provided only as an example. In use, one or more processes 502-514 may be re-ordered, performed simultaneously with one or more other processes, and/or omitted. At process 502, information is collected from one or more barrier operator systems. This information includes both measured data and operational data. Measured data encompasses information that is collected by the barrier operator 104 using one or more sensors 214. For example, motor current, barrier position, temperature(s), and/or incoming voltage may be monitored and at least temporarily recorded over the course of each barrier movement cycle. A barrier movement cycle refers to one barrier movement from the closed position to the open position and one barrier movement from the open position back to the closed position. Operational data encompasses other information recorded or modified by a barrier operator in relation to barrier movements but which does not require input information from the sensors 214. For example, a cycle count may be maintained by the barrier operator which reflects the total number of movement cycles that have been conducted by the barrier operator.

Figure 6:
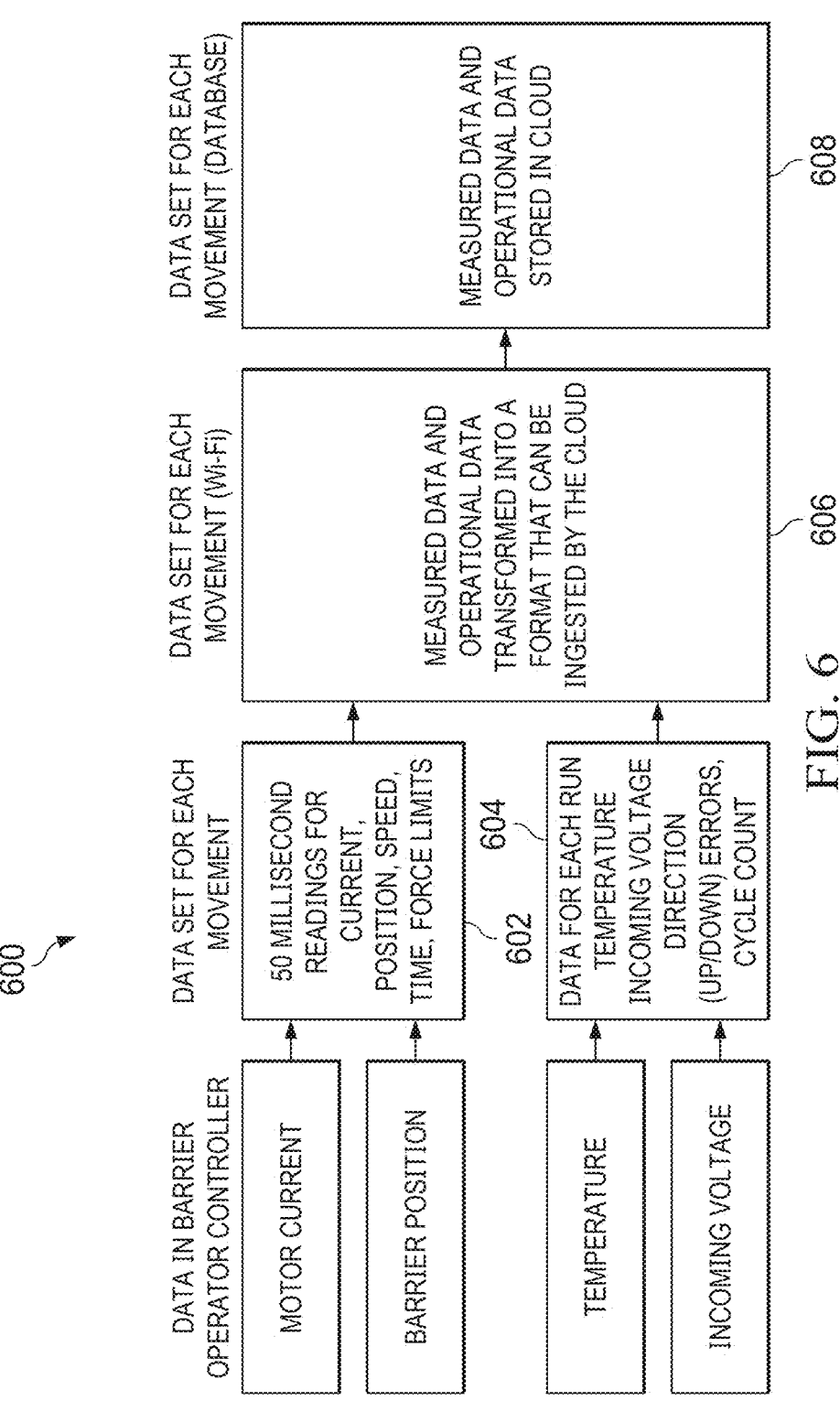
FIG. 6 shows a flowchart of a method of collecting measured data in accordance with an example of the present disclosure.

FIG. 6 illustrates an example of a method of collecting measured data and operational data in accordance with the present disclosure, which may be performed by the controller 208 of the barrier operator 104, by the controller of the cloud processing platform 130, by a controller of the personal electronic device 140, or by a combination thereof. At process 602, motor current and barrier position may be measured by the sensors 214 periodically during a barrier movement. For example, the motor current and barrier position may be sampled every 50 ms. Sensor information is received at the controller 208 of the barrier operator 104 which, in turn, records the motor current, barrier position, barrier and/or motor speed, and time at a resolution of 50 ms over the course of a barrier movement. The controller 208 also compares the motor current (which is representative of force exerted by the motor) to force limits to determine whether a force limit has been exceeded. Other measured data may not need to be sampled at such a high resolution. For example, at process 604, which may occur simultaneously with process 602, the barrier operator records temperature and incoming voltage information. This information may be recorded only once for each barrier movement or may be recorded periodically in a manner similar to the motor current and barrier position. Operational data such as error codes or cycle count may also be determined at process 604. At process 606, the measured data and operational data is passed from the controller 208 to the Wi-Fi transceiver 204 which, in turn, relays the measured data and operational data to the cloud processing platform at process 608 for storage as data 302a. In some examples, information may be transmitted to the Wi-Fi transceiver 204 in real-time as it is generated by the controller 208. In some examples, the information may be stored locally and then transmitted to the Wi-Fi transceiver 204 after completion of a barrier movement. Various considerations may render it impractical to send the raw measured data and/or operational data to cloud processing platform 130. For instance, the controller 208 may collect measured data in binary form which is impractical to transmit. Additionally, the controller 208 and/or Wi-Fi transceiver 204 may have processing constraints that preclude sending all of the raw data. Further, the cloud processing platform 130, which may be hosted by a third-party, may have data ingestion fees that render it cost-ineffective to send all of the raw data. Accordingly, process 606 may include steps to format and/or reduce the volume of data to be transmitted from the barrier operator 104 to the cloud processing platform 130, as discussed further below.

Returning to FIG. 5, at process 504 the raw measured data is transformed. This may include filtering noise from the measured data and calculating unknown attributes of the barrier operator system 102a using previously generated models or mathematical algorithms. Process 504 may estimate attributes of the barrier operator system that are not included in the data received from the barrier operator 104 (e.g., barrier mass) based on one or more attributes that are included in the data received from the barrier operator (e.g., motor current). It is contemplated that measured data may be incomplete, for example, due to transmission errors or data connection outages. As certain input data for the developed models may be required in order to accurately detect and classify certain anomalies, processes may be implemented to restore or estimate missing data. In one example, iterative machine learning processes may be performed to calculate or estimate values for missing or incomplete data that may then be used as input data for one or more diagnostic models. It may be desirable utilize checksum or parity checks and/or to implement a technique to restore missing data when it is incomplete. In some examples, a barrier operator 104 may be configured to compress and cache data from all barrier operations in non-volatile memory and to send the data when the data connection is restored. However, limits in non-volatile memory availability may render this solution insufficient when the data connection is lost for extended durations. Accordingly, data that represents the measured data collected while the barrier operator is offline may be sent. For example, see the method 900 of FIG. 9 discussed further below. Some missing data may be estimated or deduced by the cloud processing platform in the absence of data from the barrier operator 104. For example, regression of a cycle count over time may be used to estimate a number of barrier movement operations likely to have occurred while the barrier operator is offline. As another example, the cloud processing platform may determine a trend in data received prior to loss of the data connection and data received after the data connection is restored to estimate coefficients for the period of time during which the barrier operator was offline.

At process 506, the measured and operational data 302*a* are assessed to identify correlations. In some examples, measured data may be plotted to identify linear or direct correlations between different attributes. In some examples, each attribute associated with a barrier operator system may be correlated with each other attribute, for example in a correlation matrix, which can be used as a look-up table of sorts to identify expected attribute values.

At process 508, measured data and/or operational data is appended with further system data including product information including attributes such as model number, installation information, historical data, application data from the personal electronic device, configuration data (e.g., force limit settings, up/down limit settings, etc.), service history, etc. System data may be received from the barrier operator 104, from the personal electronic device 140, stored in the cloud processing platform 130 (e.g., entered by technician when installing the barrier operator system), or retrieved from external sources (e.g., cloud processing platform 130 may access external sources of meteorologic information). Barrier operators may be available in a variety of types and models having different attributes (e.g., current consumption, maximum force, etc.) and even barrier operators of the same model may be installed in different barrier operator systems with distinct attributes (e.g., door weight, door height, number of door sections, track radius, etc.). Some types of anomalies may be detectable and/or predictable using data from all available barrier operator systems in a fleet while others may be better suited for detection and prediction using only data from barrier operator systems with similar relevant attributes. In this regard, in order to render measured data and operational data from a plurality of barrier operators in a central database more useful for anomaly detection and prediction, system data may be appended to the measured data and operational data. For example, a user may be asked to enter information regarding the barrier operator system 102*a* into an application on the personal electronic device 140 upon installation and setup of the barrier operator system 102*a*. This may include attributes of the barrier 106, the tracks 108, accessories, etc. Some system data may be assigned to a barrier operator 104 at the time of manufacture such as model, serial number, etc. Additionally, service history data may be associated with a particular barrier operator system and used to classify measured data at the cloud processing platform 130. For example, a frequently maintained barrier operator system may be expected to behave like a relatively new system whereas a neglected barrier operator system may be expected to behave differently. By associating measured data in the database with system data classifying the measured data, one or more models may be configured to analyze measured data in a more accurate fashion. As supervised machine learning models may require data to be labeled with corresponding attributes, at process 510, the data 302*a* is appended to associate the measured data, operational data, and/or system data with corresponding labels indicative of barrier operator attributes and known anomalies. This labeling process structures the data 302*a* into a format that enables process 512 to model the data 302*a* using machine learning generated models and/or mathematical models. The modeling at process 512 may be based entirely on data 302*a* associated with barrier operator system 102*a*, either for a current barrier movement or for aggregate data for a plurality of barrier movements, or may incorporate at least a portion of data 302*b*-302*n* from the fleet of barrier operator systems 102*a*-102*n*. Models may be created using a subset of the available data (training data) and validated using another subset of the data (validation data). Testing the models using the validation data may provide an estimate of the quantity of false positives and/or false negatives in anomaly detection and/or prediction of the models in their current state. A confusion matrix may be formed indicating the performance of the models.

The modeling process at 512 may establish models that assess attributes of data 302*a* and detect anomalies of the barrier operator system. These detected anomalies may include predicted anomalies (e.g., the spring will soon fail) and current anomalies (e.g., the barrier is damaged). In order to train models, training data needs to be accurately labelled. For example, if a model is tasked with detecting or predicting a broken roller, the model needs to be able to distinguish between training data from barrier operator systems with a broken roller and training data from barrier operator systems without a broken roller. Similarly, if a model is tasked with estimating attributes of a barrier operator system from which measured data is received, for example determining whether a barrier operator system has a three panel barrier or a four panel barrier, the model needs to be able to distinguish between training data from barrier operator systems with a three panel barrier and barrier operator systems with a four panel barrier. In this regard, training data may be acquired from a variety of sources. Lab testing may be performed and properties of barrier operator systems and associated anomalies may be manually recorded as they occur. Anomalies may be injected into the lab testing to ensure sufficient data is obtained from normal systems and anomalous systems. A group of beta testers may be tasked with manually entering data regarding the properties of their barrier operator system and labelling anomalies as they occur. In a similar manner, all users of a mobile application for remote monitoring and control of their barrier operator systems may be requested to maintain a service log via the mobile application noting any anomalies that occur and optionally a photo of the problem (if hardware related). Further, customer service call logs may be appended to data 302*a*. Further in this regard, product dealers, distributors, and/or technicians may be asked to maintain service logs upon performing site visits to address anomalies.

At process 514, the developed models derived from process 512 are implemented in the barrier operator monitoring system 100. The models may be implemented at the barrier operator 104, at the cloud processing platform 130, at the personal electronic device 140, or any combination thereof. The models may be used to detect anomalies in the barrier operator systems 102a-102n.

While modeling and data analysis may be performed at the cloud processing platform, it is also contemplated that modeling and/or data analysis may be performed locally on a barrier operator 104. In some instances, measured data related to one or more anomaly types may be analyzed locally at a barrier operator while measured data related to one or more other anomaly types may be analyzed remotely at the cloud processing platform 130. Such an arrangement permits large-scale processing of complex fleet-wide data at the cloud processing platform 130 as well as rapid response to anomalies detected locally using mathematical analysis and/or TinyML at the barrier operator 104. Additionally or alternatively, local analysis may be conducted using a mobile application executed on the personal electronic device 140 which can retrieve measured data, operational data, and/or system data, etc., from the barrier operator 104 using, for example, Bluetooth as well as from the cloud processing platform 103 using a cellular or Wi-Fi data connection. The mobile application may utilize mathematical analysis or artificial intelligence capabilities of the personal electronic device 140.

Data Analysis

One or more of the models developed using method 500 may be implemented in the barrier operator monitoring system 100 to detect and address anomalies. One or more models may be specifically tailored to barrier operator system 102a or may be broadly applicable to any barrier operator system in the fleet. Ideally, one model could be utilized across all barrier operator systems to classify system properties and to detect and predict all anomaly types. However, due to variability between barrier operator systems and factors that lead to or indicate anomalies, numerous models may be utilized to determine barrier operator system attributes and to detect anomalies. For example, one model may be utilized for a first model of barrier operator while a different model may be utilized for different model of barrier operator. In some instances, each barrier operator model may be associated with a plurality of task-specific models. For example, a first model may be used to detect track damage while a second model may be used to detect an unbalanced barrier. Similarly, a first model may be used to detect track damage in barrier operator system using a first mass of barrier while a second model may be used to detect track damage in barrier operator systems using a second mass of door. Further, environmental factors may influence barrier operator system operation and, in turn, detection and prediction of anomalies. In this regard, different models may be used for different meteorologic or climate regions. Additionally or alternatively, measured data may be normalized or adjusted to a particular temperature or input voltage before modeling and/or outlier values may be ignored or weighted.

Figure 8:
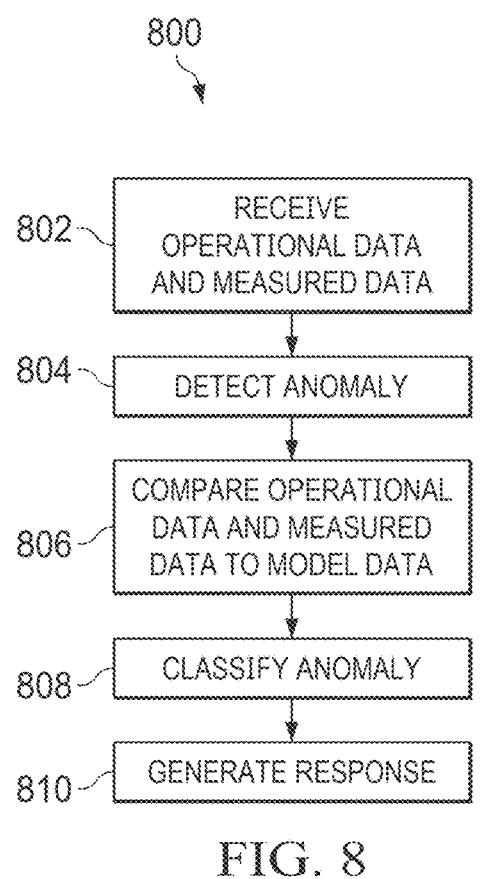
FIG. 8 shows a flowchart of a method of detecting and addressing an anomaly in accordance with an example of the present disclosure.

FIG. 8 illustrates a method 800 of detecting an anomaly in barrier operator system 102a. It should be appreciated that the processes 802-810 of method 800 are illustrated in an order that is provided only as an example. In use, one or more processes 802-810 may be re-ordered, performed simultaneously with one or more other processes, and/or omitted. The method 800 may be performed by any controller of the barrier operator monitoring system 100. At process 802, measured data and operational data are received from the barrier operator 104. At process 804, an anomaly is detected based on the measured data and operational data. For example, the operational data may contain an error code generated by the controller 208 of the barrier operator 104 or may include an anomalous spike in motor current. At process 806, the measured data and operational data are compared to model data 306. Model data 306 may include the one or more models developed at process 512. The model data 306 may include threshold values, dynamic models, static models, and/or values from historical data from one or more barrier operator systems known to be in good working condition or known to have an anomaly. Based on the comparison of the measured data and operational data with the model data, at process 808 the anomaly is classified. This classification may be based on labels associated with the model data. For example, if the measured data and operational data correspond to model data from a barrier operator system with a bent track, the anomaly may be classified as a bent track. At process 810, the barrier operator monitoring system 100 generates a suitable response to the anomaly based on the classification. For example, an anomaly classification of a bent track may be associated with a response of generating a notification for presentation to the owner on the personal electronic device 140 that the track is bent and should be inspected and/or repaired. A notification may be routed to a user device via a cloud processing platform, may be transmitted wirelessly directly from the barrier operator to a user device, or may be provided directly from the barrier operator to the user, for example, by emitting one or more light flashes and/or sounds. As another example, an anomaly classification of a broken spring may be associated with a response of generating an instruction signal for the barrier operator 104 to cease operation until a repair is performed.

In an alternative of method 800, the comparison at process 806 may be performed prior to or simultaneously with detecting the anomaly at process 804. For example, the measured data and operational data from the barrier operator 104 may not expressly indicate an anomaly is present. Rather, only upon comparison of the measured data and operational data to the model data may it become evident that an anomaly is present or may soon occur. Furthermore, in some examples of method 800, classifying the anomaly at process 808 may be omitted. For example, some anomalies may be detected (e.g., current spike) without an apparent cause that would allow the barrier operator monitoring system 100 to classify the anomaly. In this regard, the method 800 may proceed directly to process 810 upon detecting the anomaly. The response generated at process 810 may include notifying the user to schedule a service appointment for diagnosis of the anomaly.

In relation to process 810, in some examples, the barrier operator monitoring system 100 may notify a user of a maintenance need. Notifications related to detected anomalies and/or recommended maintenance may be reported locally by the barrier operator 104 or via the cloud processing platform 130 and personal electronic device 140. For example, the barrier operator may provide an audible or visual output via a speaker, light, or display screen to inform the user of an anomaly and/or recommended maintenance task. In some examples, notifications may be routed through the cloud processing platform 130 to the user's personal electronic device 140 or may be made available through a web portal. In some examples, notifications may be wirelessly transmitted directly from the barrier operator 104 to the user's personal electronic device 140 using Bluetooth or another wireless protocol. In some examples, notifications may be transmitted to service personnel, such as a technician, dealer, or distributor, notifying them of the need to contact the owner.

While it is contemplated that analysis of data 302a, using method 800 for example, may be performed locally at the barrier operator 104 or personal electronic device 140 and/or remotely by the cloud processing platform 130, processing at the cloud processing platform provides advantages of increased processing power and increased data availability. That is, the processing power available locally at the barrier operator 104 is typically limited and while it may be suitable for diagnosing or predicting some anomalies requiring limited data processing, the use of cloud processing platform 130 allows for a richer, more complex analysis. Moreover, the cloud processing platform 130 is configured to aggregate data from the fleet of barrier operator systems 102a-102n enabling it to compare data from a particular barrier operator system to data from other barrier operator systems with similar or related attributes.

As mentioned above, it may be impractical to transmit raw data from the barrier operator 104 to the cloud processing platform 130. Accordingly, the Wi-Fi transceiver 203 may transform the information received from the controller 208 of the barrier operator 104 from binary to JavaScript Object Notation (JSON) for use of Message Queuing Telemetry Transport (MQTT) protocol to deliver the information to the cloud processing platform 130. However, the volume of data to be sent from the barrier operator 104 to the cloud processing platform 130 with every barrier movement may be large, presenting several concerns. First, processing power and memory of the Wi-Fi transceiver 204 and the controller 208 of the barrier operator 104 may be limited. As such, the timing of transferring information may need to be selected to avoid interference with other operations requiring processing and memory. For example, it may be advantageous to permit the controller 208 of the barrier operator 104 to complete required barrier movement processes before requiring the controller 208 to execute transmission of the measured data and operational data to the Wi-Fi transceiver 204. Additionally, requiring the Wi-Fi transceiver 204 to transmit large volumes of data to the cloud processing platform 130 may negatively impact the ability of the Wi-Fi transceiver 204 to receive information from the cloud processing platform 130, such as remotely generated commands. Requiring the Wi-Fi transceiver 204 to transmit large volumes of data to the cloud processing platform 130 may also induce large file transfer costs from a host service of the cloud processing platform 130. In this regard, use of Hypertext Transfer Protocol Secure (HTTPS) may be utilized in lieu of MQTT to minimize ingestion costs. In this regard, the barrier operator 104 may be configured to transmit information to the cloud processing platform 130 only when an error condition is detected. That is, initial data analysis may be performed by the controller 208 of the barrier operator 104 and data may be transmitted to the cloud processing platform 130 only when an anomaly is detected based on the initial data analysis. In some examples, only a partial dataset may be transmitted from the barrier operator 104 to the cloud processing platform 130 regularly with minimal information. However, upon detection of an anomaly, the barrier operator 104 may be prompted to transmit additional information. In some examples, only information that has been altered since a previous data transmission may be sent to avoid needlessly sending redundant information. Similarly, information may be compressed to reduce volume. In some examples, only a difference between in each field between a current value and a previously transmitted value may be sent. Data quantization may be used, mapping continuous values to a smaller set of discrete values. In some examples, Transmission Control Protocol/Internet Protocol (TCP/IP) may be used to manage fragmentation, reassembly, flow control, and retry of large files to assure that all packets arrive in order. For some information, a wavelet transformation characterizing the measured data may be performed and only coefficients that represent the waveform may be sent. Each of these techniques may reduce the volume of data needed to be sent from the barrier operator 104 to the cloud processing platform 130.

As discussed above in relation to process 504, some attributes of the barrier operator system 102a may not be directly known or measured. As such, when performing data analysis to detect an anomaly, one or more models may be used to estimate the unknown attributes at process 802 of method 800. Models may be static, in that they are fixed mathematical algorithms, or may be dynamic in that they may be revised over to reflect insight gained from additional data. In one example, a model for estimating attributes of a barrier operator system is represented as:

$$F = ma + (mg+k)(H-x) + \mu_d N + \mu_s N$$

wherein:

$\mu_d N$=dynamic friction when door is horizontal in track;

$\mu_s N$=static friction when door is horizontal in track;

$N=mg$, the normal force, the portion of the door that is horizonal;

$m$=mass of door;

$a$=acceleration of door from operation;

$H$=height of door;

$x$=door position ($x=0$ when door is closed, $x=H$ when door is open);

$k$=spring constant;

$\mu_d$=coefficient of dynamic friction; and $\mu_s$=coefficient of static friction.

Commonly, a barrier is formed of a plurality of interconnected panels. The forces acting on each panel may be different. The downward and normal forces of the top door panel as it moves over the arc portion of the track 108 can be approximated by:

$$F = m_1 g * \cos(90(L-x)/L)$$

$$N = m_1 g * \sin(90(L-x)/L)$$

from $x=0+C$ when the top panel is fully vertical to $x=2h+L+C$ when the top panel is fully horizontal, wherein:

$L$=the curve of the track+the panel height=$R\theta+h$;

$R$=the radius of the arc portion of the track;

$h$=height of panel;

$m_1$=mass of the top panel;

$m_2$=mass of second panel;

$m_3$=mass of third panel;

$m_4$=mass of fourth panel (if present);

$x$=door position; and $C$=a constant equal to the distance from the top panel to the bottom of the arc.

The downward and normal forces of the second panel as it moves over the arc of the track can be approximated by:

$$F = m_2 g * \cos(90(L-x)/L)$$

$$N = m_2 g * \sin(90(L-x)/L)$$

from x=h+C when the second panel is fully vertical to x=L+h+C when the second panel is fully horizonal.

The downward and normal forces for the third panel as it moves over the arc of the track can be approximated by:

$$F=m_3g*\cos(90(L-x)/L)$$

$$N=m_3g*\sin(90(L-x)/L)$$

from x=2h+C when the third panel is fully vertical to x=L+2h+C when the third panel is fully horizonal.

In one example, a model for estimating attributes of a barrier operator is represented as:

$$F=IKT/r$$

$$I*KT/r=m*x''-\gamma*x'+(mg/h-k)*x$$

wherein:

I=motor current;

KT=torque constant of the motor;

r=radius of the track pully;

x=position of the barrier measured down from the open limit (fully horizontal);

x' and x''=first and second derivatives (speed and acceleration);

m=mass of the barrier;

Y=coefficient of viscous friction;

g=gravitational acceleration;

h=height of the barrier;

k=spring constant;

(mg/h-k)*x=barrier weight with spring;

m/h=linear density of the barrier; and (mg/h) x=barrier vertical weight.

The value of x will be 0 when the barrier is at the open position and the spring is completely unwound. The value of x increases as the barrier moves downward.

Using the models above, an estimate of unknown barrier operator system attributes can be derived based on known barrier operator system attributes, measured data, operational data, and/or system data. For example, when a barrier is properly balanced, barrier mass can be estimated as:

$$m\approx[(I-I0)*KT/r]/x''$$

When a barrier has accelerated and reached a normal constant speed, the slope of the motor current will be proportional to the spring constant k and k can be estimated using:

$$k=mg/h-(I'KT)/(rx')$$

A direct current motor is configured to drive to a constant speed for a given input voltage, but internal electromotive force will drop with current due to the voltage drop from motor winding resistance. Winding inductance can be neglected since its time constant will be much shorter than that of the barrier, as can moment of inertia of the motor, drum, etc. As such, input voltage V at the motor can be estimated using:

$$V=KV*x'/(2*\pi*r)+I*R$$

wherein:

V=the input voltage;

x'=barrier speed;

r=the pulley radius;

x'/(2*π*r)=the rotational speed of the motor;

KV=the speed constant of the motor (V/(l/s)) and is equal to KT;

I=the motor current; and

R=the winding resistance of the motor.

Using the barrier operator system models and barrier operator models discussed above, various anomalies in a barrier operator system may be detected and classified at processes 804 and/or 808. Several examples are discussed below.

Spring Failure—Springs typically break when they are at the end of their service life and the barrier is in the closed position which loads the greatest amount of force in the spring 110. If a drastic spike in force exerted by the motor 212 occurs when the barrier 106 is near the closed position and the cycle count is at or over a threshold value (e.g., 10,000 cycles), it may be inferred that the spring 110 has broken. As the spring 110 typically relaxes over time and eventually breaks, spring failure may be predicted based on cycle count of the barrier operator 104 (since the spring was installed) alone. However, this prediction method is not necessarily reliable as springs can fail well before or well after a cycle count threshold that is based on an expected service life. Accuracy can be improved by considering barrier balance over time in conjunction with cycle count in a diagnostic model. That is, duration of periods of time during which the barrier is unbalanced, the magnitude by which the barrier is unbalanced, and the number of cycles executed during the periods of time can all provide further insight into predicting spring failure. Further, changes in the spring constant of the spring and/or the cumulative time the barrier is in the closed position and experiencing maximum stress can also be used in predicting spring failure.

Door Unbalanced—The spring 110 in a barrier operator system 102a provides a majority of the lifting force required to open the barrier 106 while the barrier operator 104 provides the difference between the force exerted by the spring 110 and that required to move the barrier 106. A barrier 106 is typically considered to be balanced when it does not move when released after being manually positioned at ¼ open, ½ open, and ¾ open. A barrier is considered to be "hot" when it tends to move upward when partially opened and released and a barrier is considered to be "heavy" when it tends to move downward when partially opened and released. Barriers can become unbalanced from external conditions such as paint or decor applied to the barrier or absorption of moisture from the environment. Because springs relax over time, barriers tend to become heavy which requires the barrier operator 104 to exert additional force to open the barrier 106 than when the barrier is balanced. Diagnostic models such as those discussed herein can be used to determine the spring constant K and the mass of the barrier m to determine if the barrier is balanced. In a balanced barrier, the weight of the barrier 106 should be offset by the spring 110. In other words, when the spring 110 is fully wound, x=h, k=mg/h. A hot barrier or heavy barrier requires a different amount of force to open than to close. In this regard, an unbalanced barrier can be detected by comparing the maximum motor current required to open the barrier to the maximum motor current required to close the barrier.

Incorrect Spring—If the barrier 106 is balanced when fully closed but is not balanced at ½ open, for example, it can be determined that the spring 110 is incorrect for the barrier operator system 102a. For example, the mass of the barrier may require a different spring.

Mechanical Obstruction—If there is a drastic change in the force exerted by the motor 212 and/or speed of the barrier 106 or the force exerted exceeds a threshold, it may be determined that the barrier has encountered an obstruction. Based on the measured data, and in particular the barrier position at the time of encountering the obstruction, the type of obstruction may be estimated. For example, if a high rate of change in force exerted by the motor 212 occurs during or near the first half of the travel path of the barrier along the tracks 108 in the downward direction, it may be deduced that the barrier 106 has likely struck a vehicle. If a high rate of change in force exerted by the motor 212 occurs at or near the end of the travel path of the barrier in the downward direction, it may be deduced that the barrier 106 has likely struck an implement or tool laying on the ground (e.g., a shovel handle, a pallet, etc.). If a high magnitude of force is exerted by the motor shortly after initiating an open movement from the fully closed position, it may be deduced that a barrier lock is engaged.

Cable Off Drum—Ideally, a barrier operator 104 would respond instantaneously to encountering an obstruction while closing and would thereby immediate reverse movement of the barrier. However, practical considerations prevent such instantaneous response and, as such, in some events a barrier operator continues driving in the closed direction for a brief period after an obstruction is encountered (in some cases, prior to detection of the obstruction by the barrier operator). This may cause the barrier operator 104 to generate slack in the cables 116. That is, the barrier 106 may be vertically supported by the obstructing object while the barrier operator 104 continues to drive in the downward direction. This scenario may cause a cable 116 to slip off its respective cable drum 114. To detect this situation, the subsequent operation of the barrier operator 104 to open the door can be monitored to identify a spike in the motor current ramp rate at the start of operation while the barrier position remains stationary. In this regard, it can be deduced that a cable 116 has slipped off the drum 114.

Door Damage—If a barrier 106 is impacted, the barrier may be bent either inward or outward, depending on which side the impact occurs. This may cause damage to the panels and/or the struts. In the case of such damage, the barrier may not be able to support its weight when in the horizontal position and may bow downward. In extreme instances, this may cause one or more rollers to separate from the track 108. Diagnostic models like those discussed herein may be used to diagnose a damaged barrier by comparing portions of a force profile over a barrier movement. A bent barrier will typically require a greater amount of force when the barrier is near the upper limit and therefore bowing at a maximum extent.

Track Damage—If a segment of a track 108 is damaged, rollers will experience interference as they move through that segment of track. This will cause the barrier operator 104 to experience a force spike as each roller encounters the damaged segment of the track 108. Accordingly, track damage may be diagnosed by identifying consistent, periodic spikes in a force profile during one or more barrier movement cycles.

Mechanical Irregularity—Barrier operator systems have a natural resonance based on the various hardware components installed. It is contemplated that a resonance frequency of a barrier operator system 102a may be calculated or measured when the barrier operator system is known to be in good operating condition. If any shift in frequency is detected over the course of operation, it may be deduced that an anomaly, such as damage, as occurred. As the barrier 106 and spring 110 are the most substantial components of resonance in such systems, other components may largely be ignored in a simplified diagnostic model which may be represented by:

$$\omega_0 = \sqrt{\frac{K}{m}}$$

wherein:
   m=mass;
   K=spring constant; and
   $\omega_0$=resonance frequency.

STB Issues—Safety beams (STBs) 120a, 120b that are misaligned or blocked will prevent the barrier operator 104 from closing the barrier 106 when a closed command is received. If the STBs indicate no obstruction when the barrier is fully closed but begin to indicate an obstruction when the barrier is slightly open (e.g., 6"), it may be deduced that sunlight is causing interference. The probability of this occurrence may be increased when the time of day is near sunrise or sunset. If the receiver module 120b detects an excessive number of pulses (e.g., more than known to be produced by the transmitter module 120a), it may be deduced that the STBs are experiencing interference from another set of STBs. If the STBs indicate an obstruction for an extended period regardless of barrier position, it may be deduced that the STBs are misaligned.

Barrier Limits Set Improperly—If an excessive peak motor current or force is experienced by the barrier operator 104 each time the barrier reaches the bottom of the travel path, it may be deduced that the down limit is set improperly. A barrier may undergo expansion and contraction cycles seasonally, as may the ground at the threshold of the barrier. This may cause increased force during warm months or decreased force during cold months to be experienced by the barrier operator 104. If a gradual change in peak motor current or force is observed as seasons change, it may be deduced that the down limit should be temporarily modified. Similarly, snow or ice may buildup in the winter and cause the current or force to spike at the bottom of the travel path. In this regard, it may be deduced that such a spike, in conjunction with meteorologic information, is caused by accumulated precipitation.

In some instances, raw measured data received from one or more garage door operators may be challenging to interpret without pre-processing as performed at process 504. For example, motor current profiles may reflect significant variation during a single barrier movement as well as across sequential barrier movement cycles. In this regard, it may be advantageous to filter noise from the data using, for example, wavelet transforms as a high pass or low pass filter, removing high frequency coefficients, performing regression to characterize the waveform, performing zero crossing regression, analyzing changes between points on a curve, and/or using a force profile that characterizes force in terms of level and duration.

Figure 9:
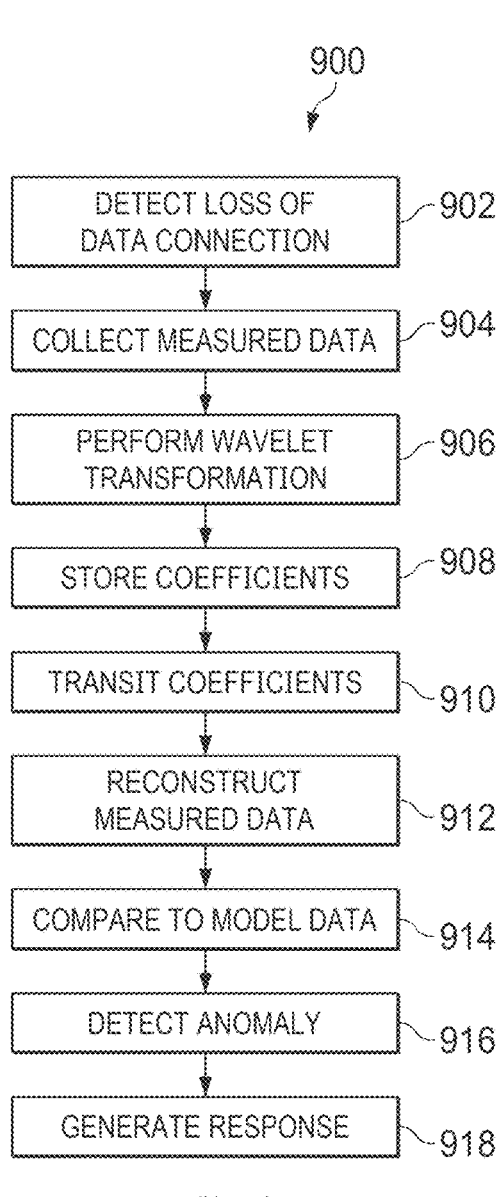
FIG. 9 shows a flowchart of a method of backfilling missing data in accordance with an example of the present disclosure.

In some instances, portions of the measured data may be missing or otherwise incomplete, rendering it difficult or impossible to detect an anomaly. Sometimes, a data connection between the barrier operator 104 and cloud processing platform 130 may be lost or interrupted. In this regard, it is contemplated that missing data may be reconstructed or backfilled at the cloud processing platform 130 to enable anomaly detection. FIG. 9 illustrates one example of a method 900 for backfilling missing data. At process 902, the barrier operator 104 detects a loss of the data connection to the cloud processing platform 130. At process 904, the barrier operator 104 collects measured data over the course of one or more barrier movement operations. As this measured data cannot be transmitted to the cloud processing platform 130 due to the lack of data connection, it is desirable to store the measured data at the barrier operator 104 until the connection is restored. However, if the data connection is lost for an extended period of time, the barrier operator 104 may lack sufficient memory to store all of the measured data. Accordingly, at process 906, the barrier operator performs one or more wavelet transformations on the measured data and, at process 908, stored the coefficients of the wavelet transformation in memory 210. These coefficients may occupy significantly less memory than the raw measured data. Upon restoration of the data connection, the barrier operator 104 may transmit the coefficients to the cloud processing platform 130 at process 910. The cloud processing platform 130 may reconstruct a representation of the measured data at process 912. Depending on the resolution and accuracy of the wavelet transformation, the representation may be an exact replica of the measured data initially determined at the barrier operator 104, may be a rough estimate of the measured data, or may fall somewhere in between along a spectrum. At process 914, the cloud processing platform 130 may compare the representation of the measured data to the model data 306 to detect an anomaly at process 916. At process 918, the cloud processing platform may generate a response to the anomaly such as transmitting a notification to personal electronic device 140 or instruction the barrier operator 104 to cease operation until maintenance is completed.

In some examples of method 900, the coefficients of the wavelet transformation may be stored in non-volatile memory only when the values have changed. That is, if measured data from one barrier operator movement is similar to measured data from the previous barrier operator movement, the barrier operator 104 may determine the coefficients match and may discard one set of coefficients to avoid unnecessary use of limited memory.

In some examples, the barrier operator 104 may be configured to only perform wavelet transformations on measured data when the data connection is lost. In other examples, the barrier operator 104 may be configured to always perform wavelet transformations on measured data and to always transmit measured data to the cloud processing platform 130 as a set of coefficients of the wavelet transformation, which may reduce the volume of data needing to be transmitted to the cloud processing platform 130.

Once a diagnostic model is developed and deployed at process 514, it can be improved over time with additional data. As additional data is collected, the new data can be used to refine the model to improve model performance as indicated in method 500 by returning to process 508 after implementing the models at process 514, forming a continuous improvement loop.

Figure 7:
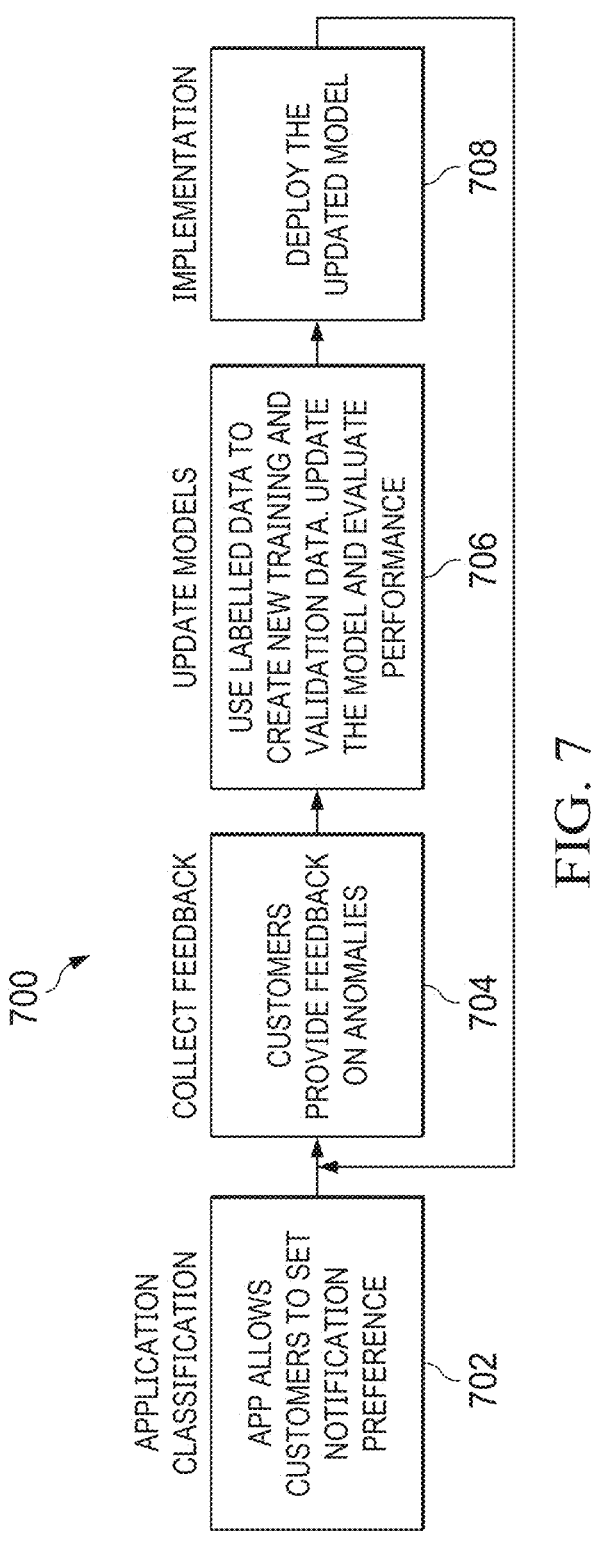
FIG. 7 shows a flowchart of a method of modifying a diagnostic model in accordance with an example of the present disclosure.

FIG. 7 illustrates a method 700 for continuous improvement of diagnostic models. At process 702, customers can set notification preferences in the application executed on their personal electronic device. Notifications may identify a detected or predicted anomaly, recommended actions to address the anomaly, and/or contact information for service personnel. The user can adjust a sensitivity of anomaly detection and notification for their barrier operator system. Some barrier operator systems are critical to business operations. For example, if the barrier does not reliably operate, business operations may be negatively impacted. In contrast, some residential systems may be less critical and even some business applications may pertain to a barrier that is rarely used such that consistent reliability is not as important. In this regard, it is contemplated that some customers may have an increased willingness to accept false positive and/or false negative notifications. Performing regular maintenance to assure that the barrier operator system is functioning properly may be less expensive than shutting down business operations due to a non-functioning door. Barrier operator systems that are critical to business operations are also likely to have a service contract for a technician to perform periodic maintenance and repairs to ensure the system stays in good condition. Such customers may be less likely to neglect maintenance needs. In other instances, some residential customers may want to receive anomaly notifications and guidance on how to best maintain their barrier operator system preventatively while others may want to be left alone until a major anomaly occurs. In this regard, the mobile application may allow a user to set notification preferences such that sensitivity to positive anomaly indications may be increased or decreased. In order to improve model function, customers willing to accept false positive notifications may be asked to provide feedback regarding diagnosed anomalies at process 704. Feedback may include confirmation of a detected anomaly or an indication that a detected anomaly was a false positive. Similarly, feedback may include information indicating that an anomaly occurred but was not detected by the barrier operator monitoring system 100 (i.e., false negative). At process 706, feedback may be appended to aggregated data (see process 508), new training and validation data sets may be generated, and a model may be updated using the new data sets to improve the model's ability to detect and classify anomalies. At process 508, the updated model may be implemented in the barrier operator monitoring system.

EXAMPLE IMPLEMENTATION

Below is a description of an example implementation of the systems and methods of the present disclosure. The example implementation pertains to implementing method 500 of FIG. 5 for detecting that a barrier is unbalanced. This implementation is provided only as an example and it should be appreciated that the systems and methods described herein may be used to diagnose and/or predict other anomalies that may arise in a garage door system, a gate system, or other barrier operator system.

Operation of a barrier operator 104 while the barrier 106 is unbalanced causes excess stress on the barrier operator motor and other power transmission components in the barrier operator system, reducing their service life. Typically, customers are unaware that their barrier is unbalanced as they commonly neglect to periodically check the barrier balance. It is conceivable that one or more sensors could be installed in a barrier operator system 102a to directly sense when a barrier is unbalanced. However, adding sensors into a barrier operator system increases cost and complexity. The inventors have recognized that indirect data from existing sensors in barrier operator systems could be used to infer that a barrier is unbalanced. An issue may arise in that the mechanical and electrical components of a barrier operator system may introduce noise into the measured data. Further, voltage, temperature, and/or other environmental variables can contribute to inconsistencies in the data.

In relation to the data collection process 502 of FIG. 5, several barrier operator systems were set up in a lab environment. The barriers were balanced such that when disconnected from the garage door operator and opened 25%, 50%, and 75%, they did not move. The barriers were operated up and down 10 times to collect measured data on motor current, force profile, position, speed, and time. These measurements were collected every 50 milliseconds. The springs on the barrier operator systems were then loosened ¼ turn at a time (making the barriers heavy) and the operation and data collection were repeated at each interval.

Figure 10:
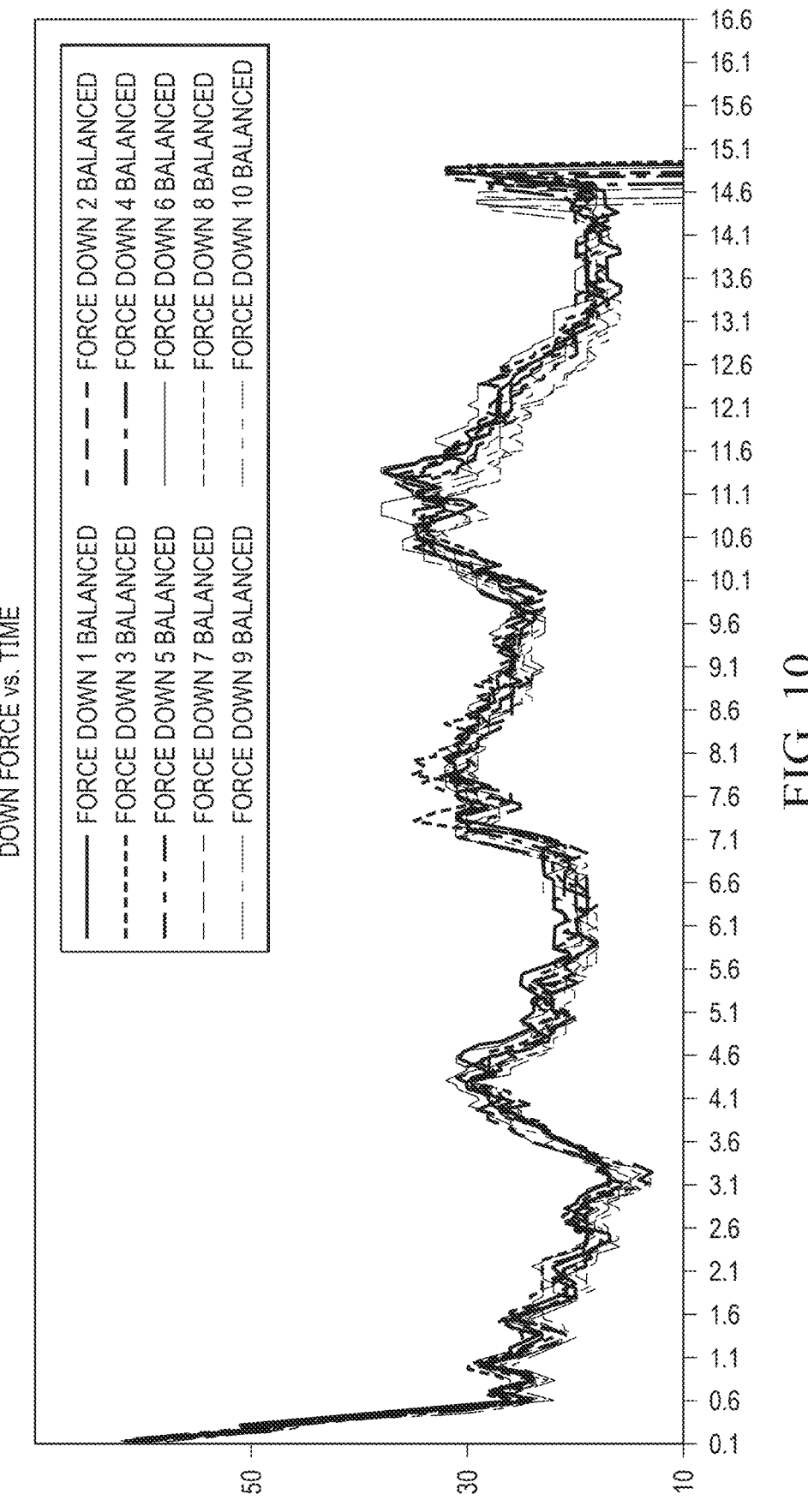
FIG. 10 shows a plot of force exerted over time during barrier closing operations of a balanced barrier in accordance with an example of the present disclosure.
Figure 11:
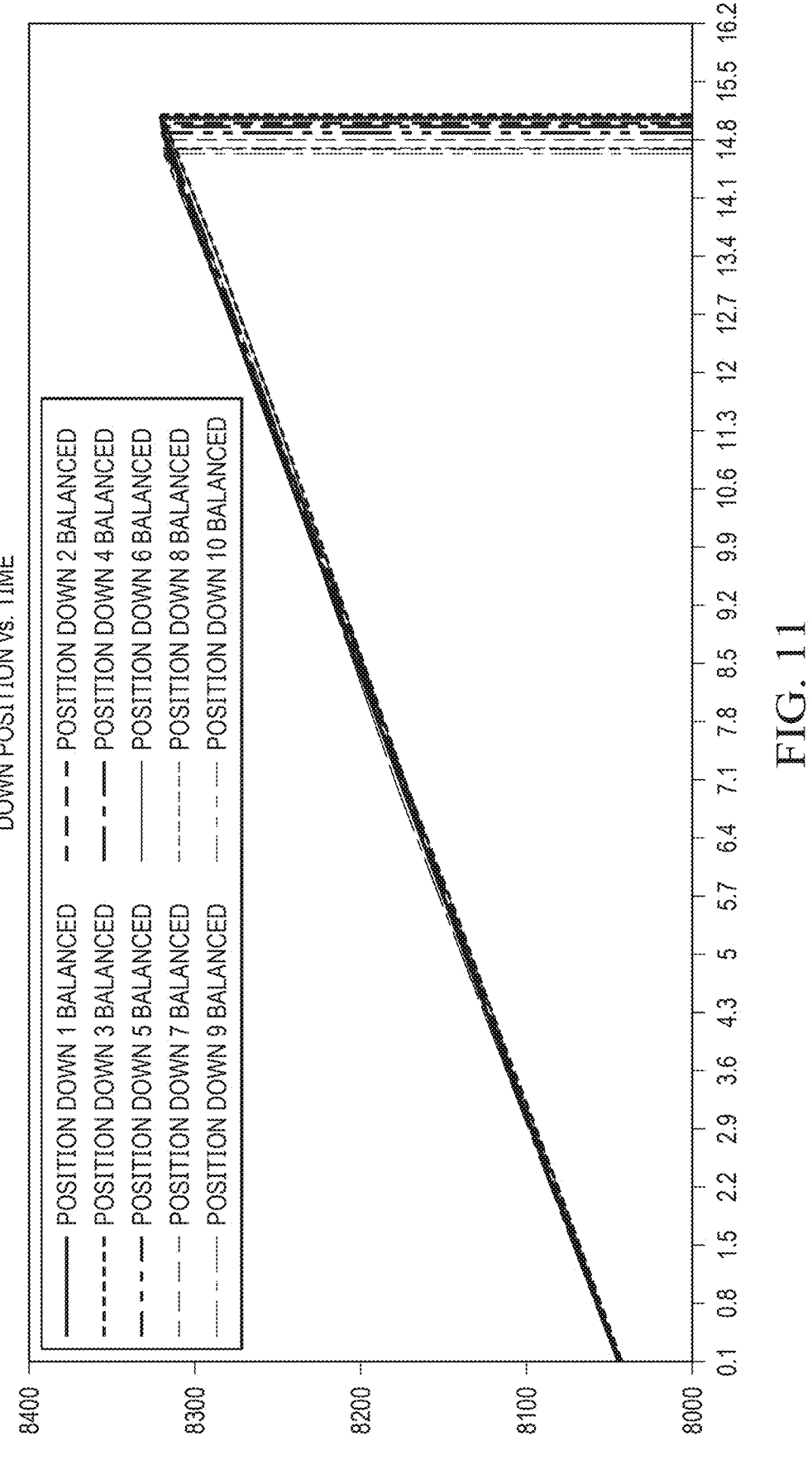
FIG. 11 shows a plot of barrier position over time during barrier closing operations of a balanced barrier in accordance with an example of the present disclosure.

The motor current while the barrier was travelling was correlated to force exerted by the motor which was, in turn, charted versus time. FIG. 10 illustrates force exerted by a motor of a barrier operator over time across ten barrier closing operations while the barrier was balanced. Noise in the data is easy to visualize. The barrier position over time and the barrier speed over time for the ten barrier closing operations with a balanced barrier were also plotted. While the speed plots had similar noise to the force plots, the position plots contain considerably less noise as shown in FIG. 11. As seen in the barrier position plots of FIG. 11, the total travel time varied across each group of runs. Particularly, as the spring is loosened and the barrier becomes heavier, the barrier operator 104 requires longer to move the barrier.

Figure 12:
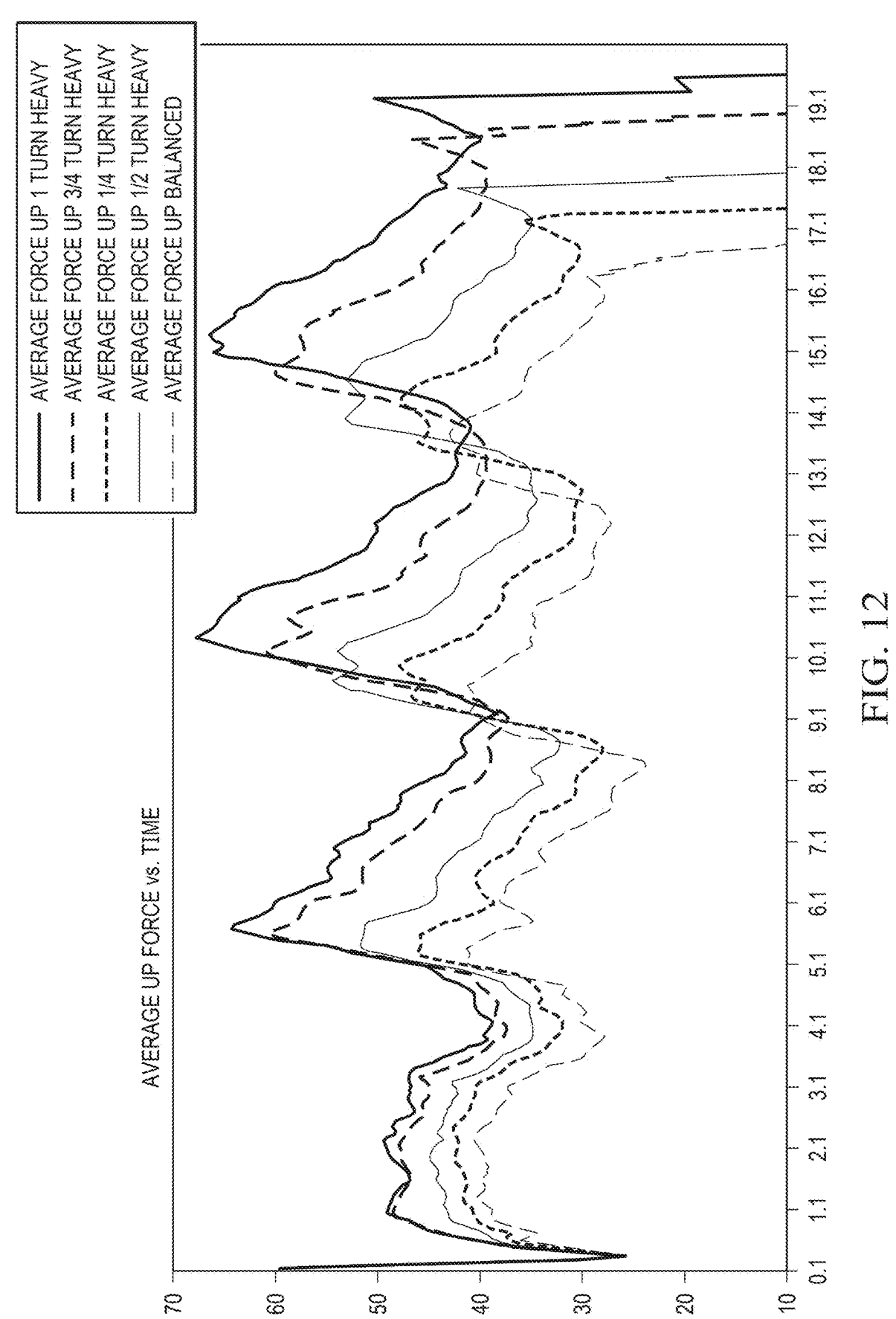
FIG. 12 shows a plot of average force exerted over time during barrier opening operations of a barrier in various states of balance in accordance with an example of the present disclosure.
Figure 13:
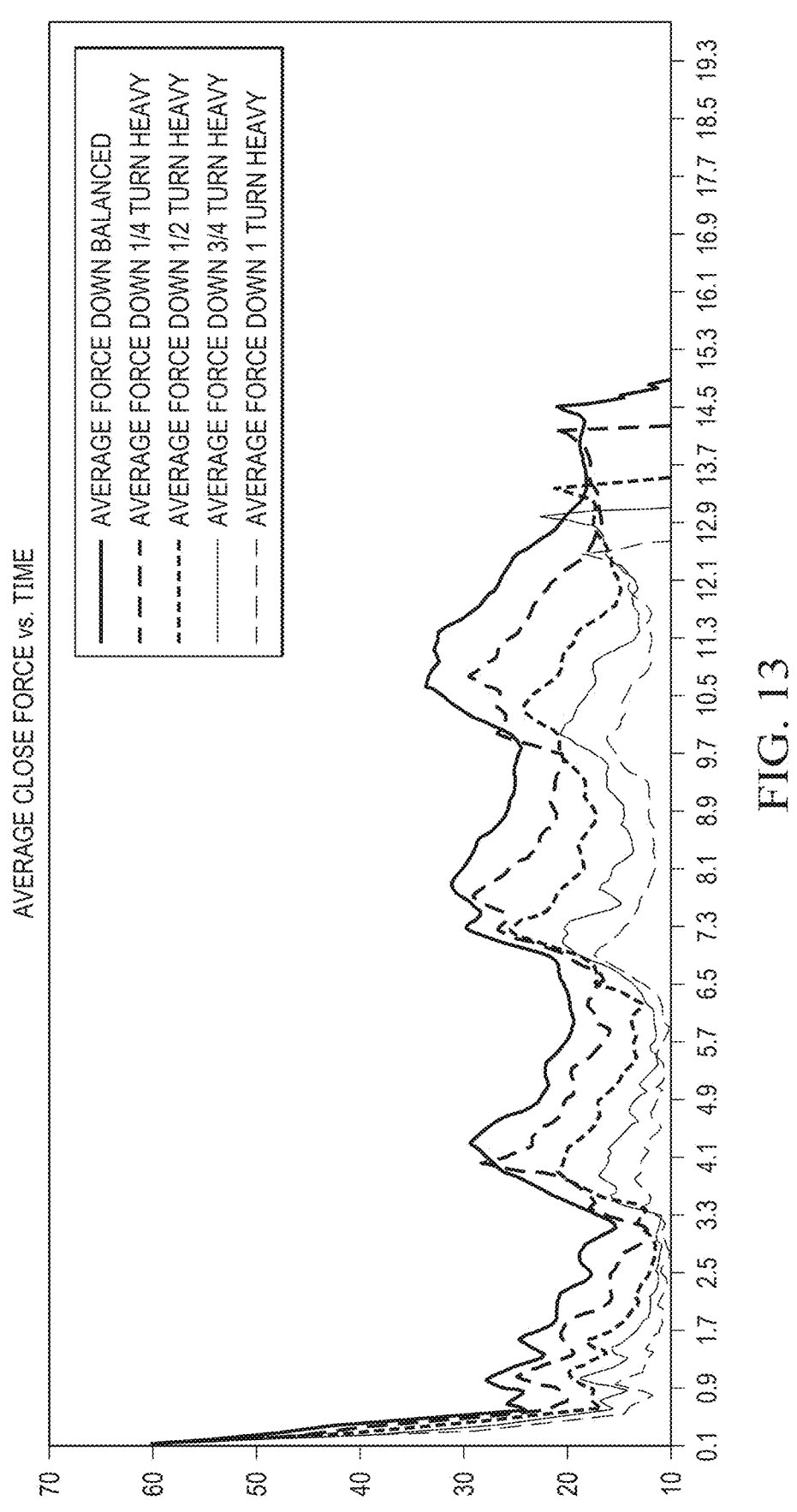
FIG. 13 shows a plot of average force exerted over time during barrier closing operations of a barrier in various states of balance in accordance with an example of the present disclosure.

In relation to process 504, to minimize noise in the motor current values, the plots across each group of runs (e.g., ten balanced barrier movements, ten ¼ turn unbalanced barrier movements, etc.) were averaged to smooth the curves. FIGS. 12-13 illustrate the resulting plots of average force exerted over time for each group. In relation to process 506, the smoothed data for each state of the spring was then compared to understand how barrier balance impacts force, position, and speed.

The peak for each curve occurred as each section of the barrier 106 travelled through the arc segment of the track 108 from horizontal to vertical or from vertical to horizontal. Ignoring initial surge current that occurs in the first 0.5 seconds of travel, each curve was summarized as a single number—the peak current (or force) that occurred after the initial surge.

Figure 14:
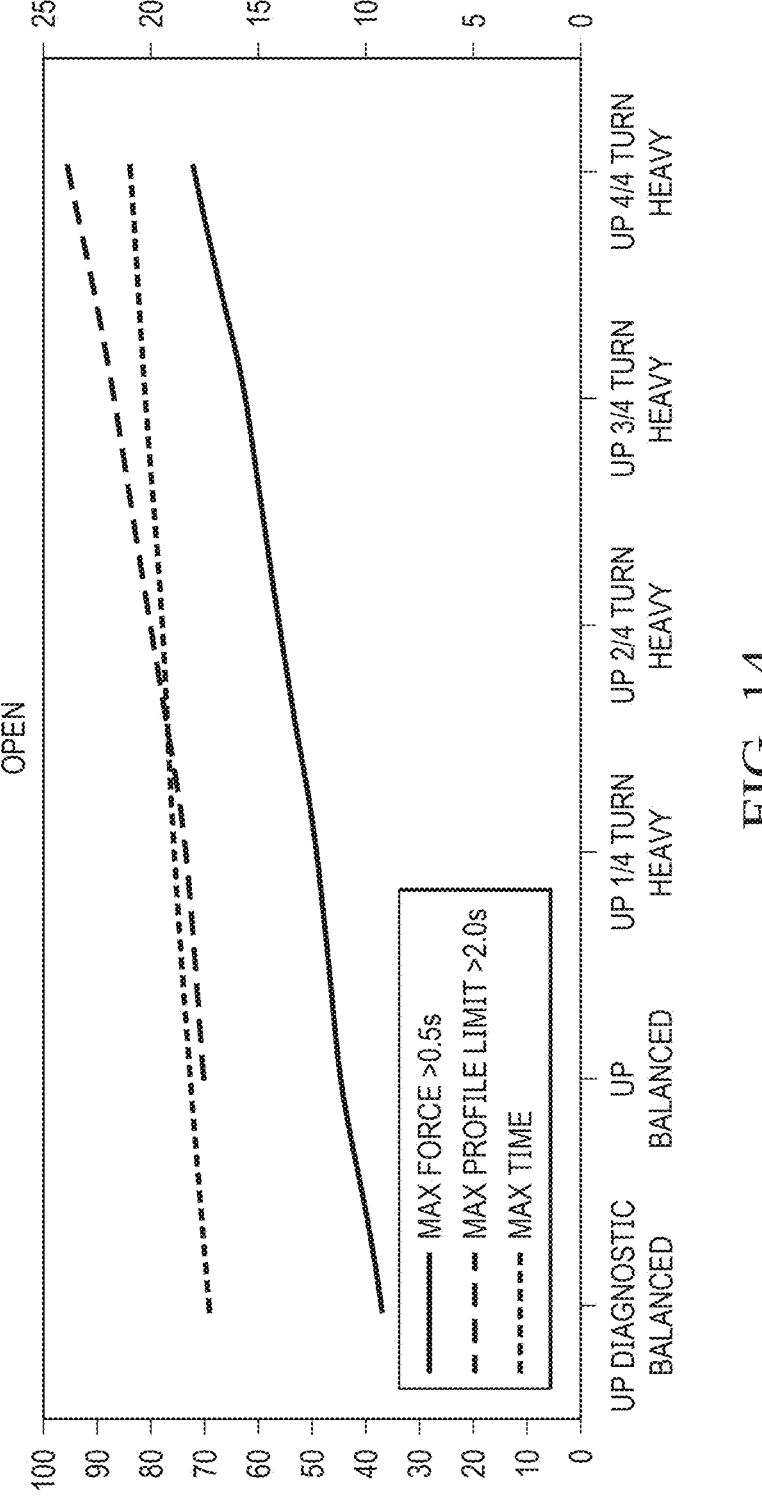
FIG. 14 shows a plot of maximum force exerted, maximum time, and maximum profile limit during barrier opening operations of a barrier in various states of balance in accordance with an example of the present disclosure.
Figure 15:
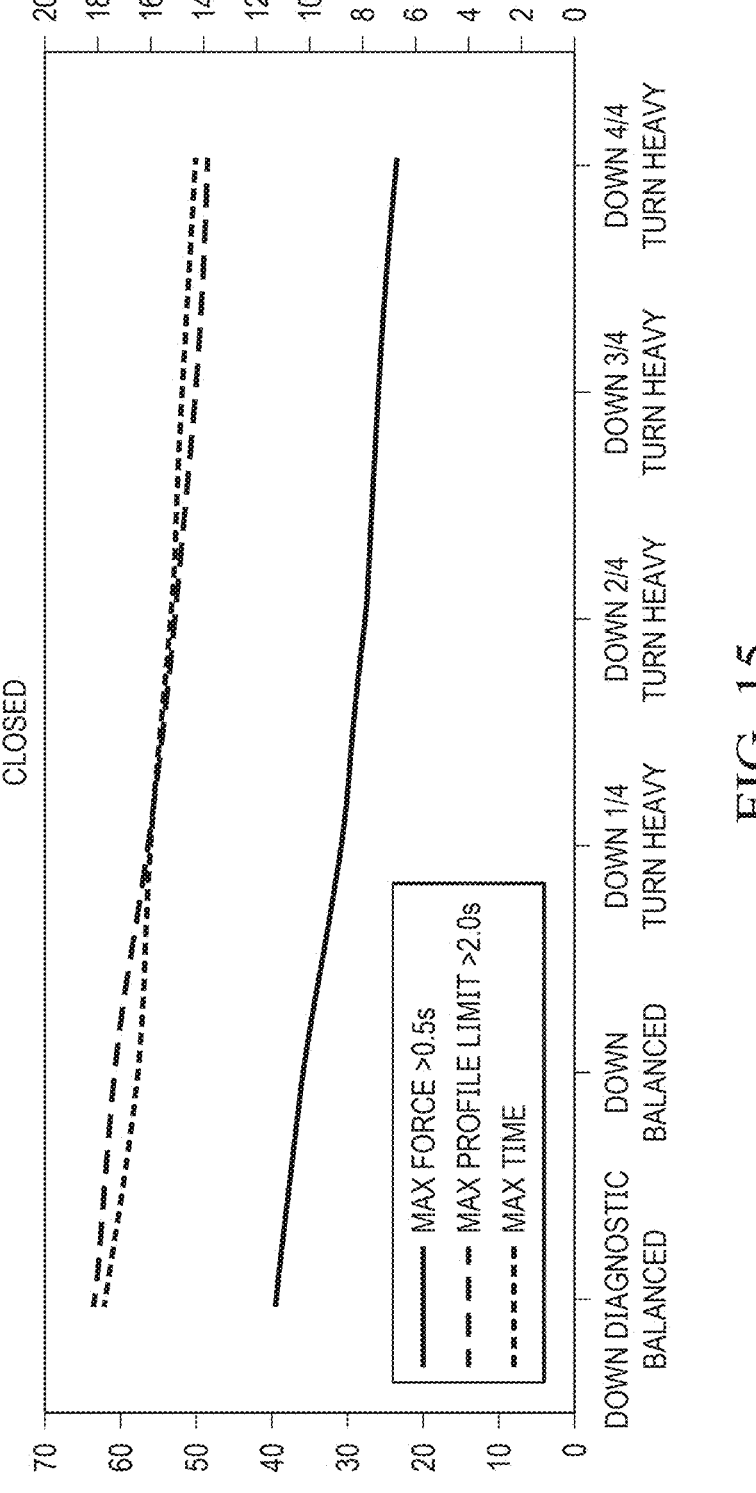
FIG. 15 shows a plot of maximum force exerted, maximum time, and maximum profile limit during barrier closing operations of a barrier in various states of balance in accordance with an example of the present disclosure.

Looking at the relationship between maximum force exerted and total travel time in each state of balance of the barrier, a linear relationship is clear. FIGS. 14-15 illustrate plots of the maximum force exerted in each state of balance of the barrier for opening movements and for closing movements. To diagnostically determine whether a barrier is heavy and by how much, the maximum force exerted and the total travel times for opening and/or closing a barrier can be compared to the plots of FIGS. 14-15. Using the maximum values for force helps to eliminate the impacts of noise.

Figure 16:
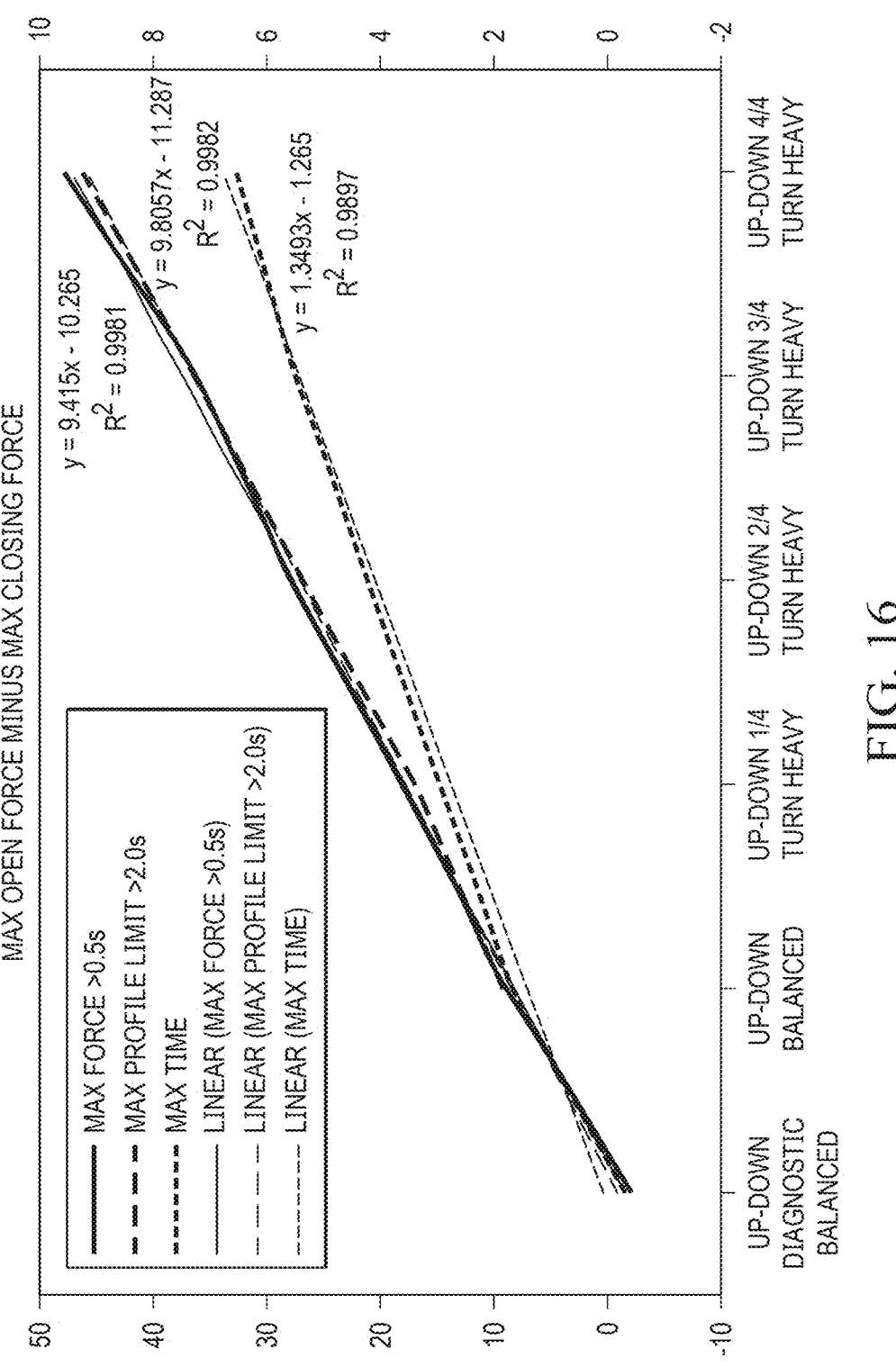
FIG. 16 shows a plot of the difference between maximum force exerted and maximum time during opening operations and closing operations of a barrier in various states of balance in accordance with an example of the present disclosure.

In relation to process 512, a diagnostic model was constructed based on the above-discussed attributes and correlations. It was determined that a reliable indicator of barrier balance is the difference between the maximum up force exerted and the maximum down force exerted, providing an $R^2$ value of 0.998. FIG. 16 illustrates the divergence that occurs between maximum opening force compared to maximum closing force as a barrier becomes increasingly unbalanced. A threshold value can be determined for use by the barrier operator monitoring system 100 to detect an unbalanced barrier condition requiring spring maintenance. The threshold value can be modified to adjust sensitivity and, in turn, the rate of false positives and false negatives. Setting the threshold value to a difference of 15% in the maximum force exerted during opening and closing, which on the plots corresponds to about ⅛ turn of the spring in the heavy direction, experimentally appeared to be a practical setting to detect barrier imbalance without false positives. Generally, when a barrier spring is adjusted by ⅛ turn heavy, the barrier will not remain stationary when released.

As the experiment results demonstrate, even a balanced barrier does experience a difference in maximum current between the opening and closing movements. It was determined that a barrier can be "diagnostically balanced" by adjusting the spring until the difference in maximum current between opening and closing movements is near zero. This approach ensures consistent motor current consumption and, from a service life perspective, is superior to the traditional approach of adjusting the spring until the barrier remains stationary at 25-75% open.

Based on the results of the experiments, it has been determined that a model for diagnosing unbalanced doors can be practically executed on a barrier operator despite memory and processor constraints. Moreover, as the profile limit value already exists in memory in many barrier operators and includes a smoothing algorithm, it is contemplated that the profile limit value could be used in lieu of averaging multiple readings of force over time to reduce memory and processing requirements.

While the above implementation indicates a variation in time required to complete barrier movements across spring settings, it is noted that further lab testing indicated that other operator models with additional power did not experience meaningful variation in operation time. As such, the developed model may be suitable for use with low-power barrier operators but less suitable for higher power barrier operators.

Any alterations and further modifications to the described devices, systems, methods, and any further application of the principles of the present disclosure are fully contemplated as would normally occur to one skilled in the art to which the disclosure relates. In particular, it is fully contemplated that the features, components, and/or steps described with respect to one example may be combined with the features, components, and/or steps described with respect to other examples of the present disclosure. In addition, dimensions and temporal relationships provided herein are for providing specific examples and it is contemplated that different sizes, dimensions, relationships and/or ratios may be utilized to implement the concepts of the present disclosure. To avoid needless descriptive repetition, one or more components or actions described in accordance with one illustrative example can be used or omitted as applicable from other illustrative examples. For the sake of brevity, the numerous iterations of these combinations will not be described separately. For simplicity, in some instances the same reference numbers are used throughout the drawings to refer to the same or like parts.

The methods described herein are illustrated as a set of operations or processes. Not all of the illustrated processes may be performed in all examples of the methods. Additionally, one or more processes that are not expressly illustrated or described may be included before, after, in between, or as part of the example processes. In some examples, one or more of the processes may be performed by a controller and/or may be implemented, at least in part, in the form of executable code stored on non-transitory, tangible, computer or machine-readable media that when run by one or more processors may cause the one or more processors to perform one, some, or all of the processes described in relation to the methods herein. Elements illustrated in block diagrams herein may be implemented with hardware, software, firmware, or any combination thereof. One block element being illustrated separate from another block element does not necessarily require that the functions performed by each separate element requires distinct hardware or software but rather they are illustrated separately for the sake of description.

One or more elements in examples of this disclosure may be implemented in software to execute on one or more processors of a computer system such as a controller. When implemented in software, the elements of the examples of the present disclosure are essentially the code segments to perform the necessary tasks. The program or code segments can be stored in a processor readable storage medium or device that may have been downloaded by way of a computer data signal embodied in a carrier wave over a transmission medium or a communication link. The processor readable storage device may include any medium that can store information including an optical medium, semiconductor medium, and magnetic medium. Processor readable storage device examples include an electronic circuit; a semiconductor device, a semiconductor memory device, a read only memory (ROM), a flash memory, an erasable programmable read only memory (EPROM); a floppy diskette, a CD-ROM, an optical disk, a hard disk, or other storage device. The code segments may be downloaded via computer networks such as the Internet, Intranet, etc. Any of a wide variety of centralized or distributed data processing architectures may be employed. Programmed instructions may be implemented as a number of separate programs or subroutines, or they may be integrated into a number of other aspects of the systems described herein. In one example, the control system supports wireless communication protocols such as Bluetooth, IrDA, HomeRF, IEEE 802.11, DECT, and Wireless Telemetry.

While certain exemplary examples of the present disclosure have been described and shown in the accompanying drawings, it is to be understood that such examples are merely illustrative of and not restrictive on the broad disclosure herein, and that the examples of the present disclosure should not be limited to the specific constructions and arrangements shown and described, since various other modifications may occur to those ordinarily skilled in the art.

What is claimed is:

1. A barrier operator monitoring system, comprising:
a cloud processing platform; and
a barrier operator system comprising:
a movable barrier;
one or more sensors configured to measure data regarding the barrier operator system; and
a barrier operator configured to:
move the movable barrier;
detect a loss of a data connection between the barrier operator and the cloud processing platform;
collect the measured data from the one or more sensors during the loss of the data connection;
perform wavelet transformation on the measured data;
store one or more coefficients of the wavelet transformation; and
transmit, upon restoration of the data connection, the one or more coefficients;
wherein the cloud processing platform is configured to:
receive the one or more coefficients;
reconstruct a representation of the measured data based on the one or more coefficients;
compare the representation of the measured data to model data;
detect an anomaly in the barrier operator system based on the comparison; and
transmit a notification from the cloud processing platform to a user device, the notification identifying the detected anomaly.

2. The barrier operator monitoring system of claim 1, wherein the barrier operator is configured to store the one or more coefficients of the wavelet transformation only when the one or more coefficients are different than corresponding coefficients of a previous wavelet transformation performed on previously measured data.

3. The barrier operator monitoring system of claim 1, wherein the barrier operator is further configured to transmit a total cycle count upon the restoration of the data connection and the cloud processing platform is further configured to estimate timing of barrier operations during a period of time corresponding to the loss of the data connection.

4. The barrier operator monitoring system of claim 1, wherein the cloud processing platform is further configured to estimate a number of barrier operations performed during a period of time corresponding to the loss of the data connection based on a change in cycle count over time occurring prior to the loss of the data connection.

5. The barrier operator monitoring system of claim 1, wherein the wavelet transformation includes convolution of a force profile with one or more wavelet functions.

6. The barrier operator monitoring system of claim 5, wherein the force profile corresponds to force exerted over time.

7. The barrier operator monitoring system of claim 5, wherein the force profile corresponds to force exerted over barrier position.

8. The barrier operator monitoring system of claim 1, wherein the one or more sensors comprise a motor current sensor.

9. The barrier operator monitoring system of claim 1, wherein the one or more sensors comprise an incoming voltage sensor.

10. The barrier operator monitoring system of claim 1, wherein the one or more sensors comprise a barrier position sensor.

11. The barrier operator monitoring system of claim 1, wherein the one or more sensors comprise a temperature sensor.

12. The barrier operator monitoring system of claim 1, wherein the cloud processing platform is further configured to generate the model data.

13. The barrier operator monitoring system of claim 12, wherein the model data is based on historical measured data received from the barrier operator.

14. The barrier operator monitoring system of claim 12, wherein the model data is based on historical measured data received from a plurality of barrier operators.

15. The barrier operator monitoring system of claim 1, wherein the cloud processing platform is configured to send an instruction to the barrier operator to suspend operation based on the detected anomaly.

16. A method in a barrier operator to backfill missing data, comprising:
detecting, at the barrier operator, a loss of a data connection between the barrier operator of a barrier operator system and a cloud processing platform;
collecting, at the barrier operator, measured data from one or more sensors during the loss of the data connection;
performing, at the barrier operator, wavelet transformation on the measured data;
storing, at the barrier operator, one or more coefficients of the wavelet transformation;
transmitting, upon restoration of the data connection, the one or more coefficients to the cloud processing platform;
reconstructing, at the cloud processing platform, a representation of the measured data based on the one or more coefficients;
comparing the representation of the measured data to model data;
detecting an anomaly in the barrier operator system based on the comparison; and transmitting a notification from the cloud processing platform to a user device, the notification identifying the detected anomaly.

17. The method of claim 16, wherein the barrier operator is configured to store the one or more coefficients of the wavelet transformation only when the one or more coefficients are different than corresponding coefficients of a previous wavelet transformation performed on previously measured data.

18. The method of claim 16, wherein the wavelet transformation includes convolution of a force profile with one or more wavelet functions.

19. The method of claim 16, wherein the wavelet transformation includes convolution of a motor current profile with one or more wavelet functions.

20. The method of claim 16, further comprising transmitting from the cloud processing platform to the barrier operator an instruction to suspend or alter operation based on the detected anomaly.

* * * * *